(12) United States Patent
Clarke et al.

(10) Patent No.: US 11,940,097 B2
(45) Date of Patent: Mar. 26, 2024

(54) SYSTEMS AND METHODS FOR STORING LIQUID HYDROGEN

(71) Applicant: Universal Hydrogen Co., Hawthorne, CA (US)

(72) Inventors: John-Paul Clarke, Austin, TX (US); Loris Gliner, Hawthorne, CA (US); John T. Hinchen, Cambridge, MA (US); Jonathan Kalow, Somerville, MA (US); Elena Koukina, Waltham, MA (US)

(73) Assignee: Universal Hydrogen Co., Hawthorne, CA (US)

( * ) Notice: Subject to any disclaimer, the term of this patent is extended or adjusted under 35 U.S.C. 154(b) by 0 days.

(21) Appl. No.: 17/515,089

(22) Filed: Oct. 29, 2021

(65) Prior Publication Data

US 2022/0136656 A1 May 5, 2022

Related U.S. Application Data

(60) Provisional application No. 63/108,048, filed on Oct. 30, 2020.

(51) Int. Cl.
*F17C 13/00* (2006.01)
*F17C 1/02* (2006.01)
*F17C 1/12* (2006.01)

(52) U.S. Cl.
CPC .............. *F17C 13/001* (2013.01); *F17C 1/02* (2013.01); *F17C 1/12* (2013.01); *F17C 13/002* (2013.01);

(Continued)

(58) Field of Classification Search
CPC .. F17C 13/001; F17C 1/02; F17C 1/12; F17C 13/002; F17C 2201/0109; F17C 2201/035;
(Continued)

(56) References Cited

U.S. PATENT DOCUMENTS 4,496,073 A * 1/1985 Silver .................... F17C 13/086
62/51.1
4,516,405 A 5/1985 Laskaris
(Continued)

FOREIGN PATENT DOCUMENTS

CA 2928590 A1 5/2015
CN 101634397 A 1/2010
(Continued)

OTHER PUBLICATIONS

International Searching Authority, International Search Report and Written Opinion, PCT Patent Application PCT/US2021/032087, dated Aug. 25, 2021, 8 pages.
(Continued)

*Primary Examiner* — John K Fristoe, Jr.
*Assistant Examiner* — Laura E. Parker
(74) *Attorney, Agent, or Firm* — Perkins Coie LLP

(57) ABSTRACT

The present disclosure provides a storage system comprising a storage tank configured to store fuel at a cryogenic temperature for a predetermined amount of time. The storage tank may have a plurality of layers comprising: a first layer comprising a pressure vessel for containing the fuel at a pressurized state; a second layer comprising insulation for the first layer; a third layer comprising a vapor barrier; and a fourth layer comprising a shell configured to maintain a rigidity of the storage tank.

13 Claims, 24 Drawing Sheets

(52) U.S. Cl.
CPC .... *F17C 2201/0109* (2013.01); *F17C 2201/035* (2013.01); *F17C 2203/012* (2013.01); *F17C 2203/0391* (2013.01); *F17C 2203/0621* (2013.01); *F17C 2221/012* (2013.01); *F17C 2225/0161* (2013.01); *F17C 2260/033* (2013.01); *F17C 2270/0168* (2013.01)

(58) Field of Classification Search
CPC ........ F17C 2203/012; F17C 2203/0391; F17C 2203/0621; F17C 2221/012; F17C 2225/0161; F17C 2260/033; F17C 2270/0168; F17C 2203/0629; F17C 2223/0161; F17C 2203/016; F17C 2203/014; F17C 2205/0149; F17C 3/08; Y02E 60/32
USPC .................................................. 220/560.12
See application file for complete search history.

(56) References Cited

U.S. PATENT DOCUMENTS

| | | | |
|---|---|---|---|
| 6,745,801 | B1 | 6/2004 | Cohen et al. |
| 6,886,609 | B2 | 5/2005 | Cohen et al. |
| 7,641,068 | B2 | 1/2010 | Immel et al. |
| 8,025,721 | B2 | 9/2011 | Behruzi et al. |
| 8,048,211 | B2 | 11/2011 | Behruzi et al. |
| 8,381,938 | B2 | 2/2013 | Behruzi et al. |
| 8,523,105 | B2 | 9/2013 | Buchheit |
| 9,108,730 | B2 | 8/2015 | Grossman |
| 9,118,054 | B2 | 8/2015 | Gummalla et al. |
| 9,555,887 | B2 | 1/2017 | Grossman |
| 9,643,656 | B1 | 5/2017 | Hall et al. |
| 9,678,515 | B2 | 6/2017 | Lapena-rey et al. |
| 9,777,889 | B2 | 10/2017 | Leachman et al. |
| 9,873,408 | B2 | 1/2018 | Capizzo |
| 9,963,241 | B2 | 5/2018 | Schramm et al. |
| 10,040,569 | B2 | 8/2018 | Filangi et al. |
| 10,112,718 | B2 | 10/2018 | Knepple et al. |
| 10,131,430 | B2 | 11/2018 | Grossman |
| 10,422,478 | B2 | 9/2019 | Leachman et al. |
| 10,435,155 | B2 | 10/2019 | Grossman |
| 10,583,935 | B2 | 3/2020 | Hoffjann |
| 10,608,270 | B2 | 3/2020 | Autrusson et al. |
| 11,420,757 | B2 | 8/2022 | Clarke et al. |
| 11,525,544 | B2 | 12/2022 | Clarke et al. |
| 11,718,410 | B2 | 8/2023 | Clarke et al. |
| 2002/0171236 | A1 | 11/2002 | Joitescu et al. |
| 2004/0163731 | A1 | 8/2004 | Eichelberger et al. |
| 2004/0206762 | A1 | 10/2004 | Iida et al. |
| 2005/0100767 | A1 | 5/2005 | Stolmar |
| 2006/0033322 | A1 | 2/2006 | Suess |
| 2007/0228048 | A1* | 10/2007 | Immel ............... F17C 13/021 220/560.1 |
| 2008/0264551 | A1 | 10/2008 | Wood |
| 2010/0018603 | A1 | 1/2010 | Adler et al. |
| 2012/0048862 | A1 | 3/2012 | Otsuka et al. |
| 2013/0288148 | A1 | 10/2013 | Kazuno et al. |
| 2014/0166662 | A1* | 6/2014 | Snyder ............... F17C 13/00 220/560.1 |
| 2014/0263358 | A1* | 9/2014 | Espinosa-Loza ....... F17C 13/06 220/560.04 |
| 2015/0183338 | A1 | 7/2015 | Lee et al. |
| 2015/0330576 | A1* | 11/2015 | Zhai ............... F17C 13/001 220/560.12 |
| 2016/0159492 | A1 | 6/2016 | Filangi, Jr. et al. |
| 2017/0268724 | A1 | 9/2017 | Kanezaki et al. |
| 2017/0327091 | A1 | 11/2017 | Capizzo |
| 2017/0341769 | A1 | 11/2017 | Haberbusch et al. |
| 2017/0373333 | A1 | 12/2017 | Kajiura et al. |
| 2018/0111475 | A1 | 4/2018 | Wexler et al. |
| 2018/0134401 | A1 | 5/2018 | Halsey et al. |
| 2018/0151898 | A1 | 5/2018 | Knapp |
| 2018/0208463 | A1 | 7/2018 | Halsey et al. |
| 2018/0252365 | A1 | 9/2018 | Takami et al. |
| 2018/0346330 | A1 | 12/2018 | Halsey et al. |
| 2019/0009917 | A1 | 1/2019 | Anton et al. |
| 2019/0032851 | A1 | 1/2019 | Adler et al. |
| 2019/0077521 | A1 | 3/2019 | Kelly et al. |
| 2019/0226638 | A1 | 7/2019 | Heydorn et al. |
| 2019/0292973 | A1 | 9/2019 | Jiang et al. |
| 2020/0133286 | A1 | 4/2020 | Bellar et al. |
| 2020/0164985 | A1 | 5/2020 | Grossman |
| 2020/0180774 | A1 | 6/2020 | Rainville |
| 2020/0180940 | A1 | 6/2020 | Rainville |
| 2020/0354073 | A1 | 11/2020 | Miftakhov |
| 2020/0355117 | A1 | 11/2020 | Miftakhov |
| 2020/0358117 | A1 | 11/2020 | Miftakhov et al. |
| 2020/0385127 | A1 | 12/2020 | Devault |
| 2020/0395626 | A1 | 12/2020 | Grishashvili |
| 2021/0054971 | A1 | 2/2021 | Ernull et al. |
| 2021/0098805 | A1 | 4/2021 | Poirier et al. |
| 2021/0151783 | A1 | 5/2021 | Miftakhov |
| 2021/0164616 | A1 | 6/2021 | Shah et al. |
| 2021/0261260 | A1 | 8/2021 | Miftakhov |
| 2021/0320353 | A1 | 10/2021 | Miftakhov et al. |
| 2022/0009648 | A1 | 1/2022 | Clarke et al. |
| 2022/0055762 | A1 | 2/2022 | Clarke et al. |
| 2022/0074548 | A1 | 3/2022 | Clarke et al. |

FOREIGN PATENT DOCUMENTS

| | | | |
|---|---|---|---|
| CN | 102388257 | A | 3/2012 |
| CN | 104752745 | A | 7/2015 |
| CN | 107004887 | A | 8/2017 |
| CN | 207658075 | U | 7/2018 |
| CN | 108657434 | A | 10/2018 |
| CN | 109178325 | A | 1/2019 |
| CN | 111268144 | A | 6/2020 |
| DE | 102020106848 | A1 | 9/2020 |
| EP | 2418414 | A1 | 2/2012 |
| EP | 3420434 | A1 | 1/2019 |
| EP | 3421864 | B1 * | 1/2020 ............... F17C 3/00 |
| EP | 3421864 | B1 | 1/2020 |
| EP | 3498664 | B1 | 8/2020 |
| FR | 2921459 | A1 | 3/2009 |
| GB | 914193 | A | 12/1962 |
| GB | 1322251 | A | 7/1973 |
| GB | 2396851 | A | 7/2004 |
| WO | 2015084170 | A1 | 6/2015 |
| WO | 2018175349 | A1 | 9/2018 |
| WO | 2020002462 | A1 | 1/2020 |
| WO | 2020060488 | A1 | 3/2020 |
| WO | 2021231647 | A1 | 11/2021 |
| WO | 2021231649 | A1 | 11/2021 |
| WO | 2022040054 | A1 | 2/2022 |
| WO | 2022094300 | A1 | 5/2022 |

OTHER PUBLICATIONS

International Searching Authority, International Search Report and Written Opinion, PCT Patent Application PCT/US2021/032090, dated Sep. 9, 2021, 9 pages.

International Searching Authority, International Search Report and Written Opinion, PCT Patent Application PCT/US2021/046027, dated Feb. 7, 2022, 23 pages.

International Searching Authority, International Search Report and Written Opinion, PCT Patent Application PCT/US2021/057385, dated Mar. 14, 2022, 15 pages.

* cited by examiner

SYSTEMS AND METHODS FOR STORING LIQUID HYDROGEN

CROSS-REFERENCE TO RELATED APPLICATIONS

This non-provisional patent application claims the benefit of and priority to U.S. Provisional Patent Application No. 63/108,048, titled SYSTEMS AND METHODS FOR STORING LIQUID HYDROGEN, filed Oct. 30, 2020, which is incorporated herein in its entirety by reference thereto.

BACKGROUND

Vehicles may be operated using a fuel source that may be stored in a container, vessel, tank, storage unit, or other storage module. The fuel source may be transferred into and/or out of such container, vessel, tank, storage unit, or other storage module. The container, vessel, tank, storage unit, or storage module may be configured to provide the fuel source to one or more components or subsystems of a vehicle to enable such vehicle to generate energy and deliver power to a propulsion system for movement and transportation.

SUMMARY

Hydrogen can be leveraged as a clean energy source to power various vehicles, including aircraft. Hydrogen can provide a distinct advantage over other types of fuel, such as diesel, gasoline, or jet fuel, which have specific energies of about 45 megajoules per kilogram (MJ/kg), or lithium-ion batteries, which have a specific energy that generally ranges from about 0.4 MJ/kg to about 1.4 MJ/kg. The specific energy of aviation gas or jet fuel may generally range from about 43 and about 48 MJ/kg. In contrast, hydrogen has a specific energy of over 140 MJ/kg. As such, 1 kg of hydrogen can provide the same amount of energy as about 3 kg of gasoline or kerosene. Thus, using hydrogen as a fuel source for vehicles can reduce the weight of vehicles while providing a comparable amount of energy as other traditional sources of fuel. Further, consuming hydrogen for fuel may emit benign or nontoxic byproducts, such as water, while minimizing carbon dioxide and nitrous oxide emissions, thereby reducing the environmental impacts of various modes of transportation that use hydrogen as a fuel source.

Recognized herein are various limitations with conventional hydrogen fuel storage systems currently available. Conventional fuel storage systems may not be optimized for storage of highly pressurized and/or cryogenic fuels for extended periods of time. As such, commercially available fuel storage systems may need to vent a portion of the stored fuel before the fuel storage systems are transported or delivered to a vehicle fueling site. Further, conventional fuel storage systems may not be optimized for volumetric and mass efficiency, which means that more storage tanks need to be transported per trip in order to deliver a given amount of fuel.

The present disclosure addresses at least the above-mentioned shortcomings associated with conventional fuel storage systems. The technology of the present application relates generally to fuel storage systems and, more particularly, to fuel storage systems for hydrogen fuel. The fuel storage systems of the present disclosure may be used to store and transport hydrogen fuel in a reliable and cost-efficient manner. The systems and methods of the present disclosure may be used to store hydrogen fuel for extended periods of time while (i) minimizing fuel leakage and (ii) delaying or reducing the need to vent pressurized hydrogen stored within a fuel tank. The systems and methods of the present disclosure may also provide a volumetrically efficient and mass efficient fuel storage solution that increases the amount of fuel that can be stored and transported in a single trip.

In addition to the benefits and advantages described above, the systems and methods of the present technology may also be used to safely store and transport hydrogen while buffering or shielding the hydrogen from potential changes in storage conditions (changes in temperature, pressure, etc.) and/or mitigating the impacts of such changes. The systems and methods of the present disclosure may also be used to efficiently transport hydrogen while isolating fuel storage modules from vibrations or external movements that may damage the storage modules or the hydrogen contained within. The systems and methods of the present disclosure may be implemented to enable quick, convenient, and precise interfacing of hydrogen fuel tanks or storage modules with (1) hydrogen production or processing equipment, (2) transport vehicles for moving and transporting hydrogen fuel between two or more distinct locations, and/or (3) hydrogen fuel compatible vehicles and various systems or subsystems of such hydrogen fuel compatible vehicles, including structural components, power delivery systems, aircraft control systems, propulsion systems, transportation infrastructure, and/or recycling infrastructure. The systems and methods of the present disclosure may be used to enable efficient loading of hydrogen fuel storage modules into vehicles (including both transport vehicles and hydrogen fuel compatible vehicles) as well as efficient unloading and inspection of spent or partially spent hydrogen fuel storage modules from vehicles. The systems and methods of the present disclosure may be used to reduce costs, labor, and the amount or complexity of infrastructure associated with the transportation and delivery of hydrogen.

In an aspect, the present technology of this disclosure provides a system for storing fuel. The system may comprise a storage tank configured to store fuel at a cryogenic temperature for a predetermined amount of time, wherein the storage tank has a plurality of layers comprising: a first layer that forms a pressure vessel for containing the fuel at a pressurized state; a second layer comprising insulation for the first layer; a third layer comprising a vapor barrier; and a fourth layer comprising a shell configured to maintain a rigidity of the storage tank.

In some embodiments, the system further comprises one or more crenelated rings positioned between at least two layers of the plurality of layers. In other embodiments, the system comprises adjustable tensioning assemblies between and coupled to at least two spaced-apart layers of the plurality of layers.

In some embodiments, the system further comprises a tie rod that couples a first internal portion of the storage tank to a second internal portion of the storage tank, wherein the tie rod is configured to alleviate and redistribute structural loads in the pressure vessel. In some embodiments, the first internal portion and the second internal portion correspond to one or more inner walls of the first layer. In some embodiments, the tie rod is solid. In some embodiments, the tie rod is hollow. In some embodiments, the tie rod comprises aluminum alloys, steel alloys, carbon fiber, fiberglass, or any combination thereof.

In some embodiments, the cryogenic temperature ranges from about 15 Kelvin to about 30 Kelvin. In some embodiments, the predetermined amount of time is up to about 80 hours without leaking more than a di minimis amount and/or without the need for venting the hydrogen from within the tank.

In some embodiments, the storage tank has a cylindrical shape with hemispherical ends. In some embodiments, the storage tank has a cylindrical shape with dimpled ends which enable a plurality of storage tanks comprising the storage tank to be stacked in series in a volumetrically efficient manner. In some embodiments, the storage tank having the cylindrical shape with dimpled ends has a greater volumetric efficiency than a storage tank having hemispherical ends, when stacked in series.

In some embodiments, the fuel comprises liquid hydrogen, solid hydrogen, gaseous hydrogen, or any combination thereof.

In some embodiments, the first layer comprises aluminum alloys, steel alloys, or carbon fiber. In some embodiments, the second layer comprises alternating sheets of spaced superinsulation to minimize heat transfer due to thermal radiation. In some embodiments, the third layer comprises mylar, an aluminum alloy, glass fiber composite, or any combination thereof. In some embodiments, the fourth layer comprises an aluminum alloy, a steel alloy, or carbon fiber.

In some embodiments, the one or more crenelated rings comprise fiberglass. In some embodiments, the one or more crenelated rings comprise a plurality of crenellations disposed on an outer edge of the crenelated rings to limit a contact area and a thermal conduction between the plurality of layers. In some embodiments, the one or more crenelated rings provide a plurality of anchor points for the second layer.

In some embodiments, a storage system comprising a storage tank configured to store fuel at a cryogenic temperature. The storage tank has a plurality of layers that include a first layer forming a pressure vessel for containing the fuel at the cryogenic temperature and at a pressurized state. A second layer comprises insulation for the first layer. A third layer forms an outer shell configured to maintain a rigidity of the storage tank. A vapor barrier can be provided between the pressure vessel and the outer shell, although in other embodiments the pressure vessel and/or the outer shell act as a vapor barrier to block transmission of hydrogen through the storage tank. A plurality of retention members interconnect the first layer and the third or fourth layer and allow for movement of the first layer relative to the fourth layer due to contraction and expansion of the first layer. In some embodiments, the retention members are retention strap assemblies interconnecting the first and fourth layers. The retention strap assemblies can include a first anchor portion coupled to the first layer, a second anchor portion coupled to the fourth layer, and a strap member extending between and interconnecting the first and second anchor portions. The first and/or the second anchor portions can be adjustable to control and set an initial tension in the strap member. The retention strap assemblies are configured so that, once the retention strap assembly is adjusted and set, the corresponding the strap member maintains a constant length and constant tension as pressure vessel expands or contracts relative to the outer shell. In one or more embodiments, the first or second anchor portion includes a translatable carriage coupled to the strap member, wherein the translatable carriage is movable relative to the first and fourth layers. In one or more embodiments comprise a line connection body connected to the outer shell, a first fuel line external of the outer shell and connected to the line connection body, and a second fuel line at least partially within the pressure vessel and in fluid communication with the first fuel outlet line through the fuel line connection body, and an expansion member connected to the line connection body and to a proximal end of the second fuel outlet line, wherein the expansion member is configured to expand and contract upon movement of the pressure vessel relative to the outer shell. The expansion member can be a bellows positioned between the pressure vessel and the outer shell.

In other embodiments, a hydrogen fuel storage system comprises a storage tank configured to store hydrogen fuel, wherein the storage tank has an internal pressure vessel that contains the hydrogen fuel in at least a liquid phase and at a pressurized state. An outer shell is spaced radially apart from the pressure vessel to form a volume between the outer shell and the pressure vessel, wherein a vacuum is drawn in the volume. A vapor barrier is in the volume and configured to block transmission of hydrogen gas from the pressure vessel to the outer shell. Insulation is in the volume and is configured to block thermal transfer across the volume between the pressure vessel and the outer shell. A plurality of retention members are provided in the volume and supporting the pressure vessel in the volume and spaced apart from the outer shell. The retention members are configured to allow for movement of the pressure vessel relative to the outer shell due to thermal contraction and expansion of the pressure vessel. A line connection body is connected to the outer shell and positioned in or adjacent to the volume between the outer shell and the pressure vessel. An external fuel line is exterior of the outer shell, and a fuel pickup line is at least partially within the pressure vessel and in fluid communication with the external fuel outlet line through the line connection body. An expansion bellows is connected to the line connection body and to a proximal end of the fuel pickup line. The expansion bellows is configured to expand and contract upon the thermal contraction and expansion of the pressure vessel relative to the outer shell.

In another embodiment, a hydrogen fuel storage system in accordance with the present technology includes a storage tank configured to store hydrogen fuel. The storage tank comprises an internal pressure vessel configured to contain the hydrogen fuel in at least a liquid phase and at a pressurized state. An outer shell is spaced radially apart from the pressure vessel to form a volume between the outer shell and the pressure vessel, wherein the volume is maintained at a vacuum. A vapor barrier can be provided in the volume and is configured to block transmission of hydrogen gas from the pressure vessel to the outer shell. A line connection body is connected to the outer shell and positioned in or adjacent to the volume between the outer shell and the pressure vessel. An external fuel line is exterior of the outer shell, and a fuel pickup line is at least partially within the pressure vessel and in fluid communication with the external fuel outlet line through the line connection body. An expansion bellows is connected to the line connection body and to a proximal end of the fuel pickup line. The expansion bellows is configured to expand and contract upon the thermal contraction and expansion of the pressure vessel relative to the outer shell.

In some embodiments, the system further comprises a hydrogen pickup line to capture and distribute gaseous hydrogen. In some embodiments, the hydrogen pickup line is positioned adjacent to a top portion of the tank. In some embodiments, the hydrogen pickup line is on a float such that the pickup line is above a fuel level of the fuel. In some embodiments, the pickup line comprises an internal heater to ensure distribution of gaseous hydrogen, even if the pickup line is submerged.

In some embodiments, the system further comprises a primary electric heater configured to heat up liquid hydrogen within the tank and control a pressure of the tank.

In some embodiments, the system further comprises a plurality of sensors for measuring a tank pressure, a tank temperature, and a fuel level.

In some embodiments, the system further comprises one or more bosses on an exterior portion of the storage tank. In some embodiments, the one or more bosses comprise a main outlet for consuming or refilling fuel. In some embodiments, the main outlet is operatively coupled to at least one of (i) a pressure sensor, (ii) an overpressure valve, and (iii) a control valve configured to control a mass flow rate of fuel into and out of the storage tank. In some embodiments, the one or more bosses comprise a breather outlet for venting gas present in the storage tank during a filling operation. In some embodiments, the one or more bosses comprise one or more passageways for routing electrical connections, wherein the electrical connections are configured to connect one or more sensors, actuators, or heaters within the storage tank to an external computing unit or power source. In some embodiments, the one or more bosses comprise an insulation layer to minimize heat transfer between the fuel stored within the storage tank and a surrounding environment of the storage tank. In some embodiments, the insulation layer comprises alternating sheets of a spaced superinsulation to minimize heat transfers due to thermal radiation. In some embodiments, the insulation layer is held at a high vacuum to minimize heat transfer due to thermal conduction or convection. In some embodiments, the one or more bosses comprise a main outlet and a breather outlet. The breather outlet is located within the main outlet to reduce heat leak. In some embodiments, the bosses comprise a main outlet and a breather outlet, wherein the main outlet and the breather outlet are physically disconnected from an inner cap of the bosses when hydrogen is not being consumed or refilled.

In some embodiments, the system further comprises a support tube to bear a structural load between an inner cap and an outer cap of the one or more bosses. In some embodiments, the support tube comprises a material with a low thermal conductivity. In some embodiments, the support tube comprises fiberglass or a rigid plastic.

Another aspect of the present disclosure provides a non-transitory computer readable medium comprising machine executable code that, upon execution by one or more computer processors, implements any of the methods above or elsewhere herein.

Another aspect of the present disclosure provides a system comprising one or more computer processors and computer memory coupled thereto. The computer memory comprises machine executable code that, upon execution by the one or more computer processors, implements any of the methods above or elsewhere herein.

Additional aspects and advantages of the present disclosure will become readily apparent to those skilled in this art from the following detailed description, wherein only illustrative embodiments of the present disclosure are shown and described. As will be realized, the present technology is capable of other and different embodiments, and its several details are capable of modifications in various obvious respects, all without departing from the disclosure. Accordingly, the drawings and description are to be regarded as illustrative in nature, and not as restrictive.

BRIEF DESCRIPTION OF THE DRAWINGS

The novel features of the present disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings (also "Figure" and "FIG." herein), of which:

FIGS. 17-1, 17-2 and 17-3 schematically illustrate an operation of the storage tank to release hydrogen fuel from the storage tank, in accordance with some embodiments.

DETAILED DESCRIPTION

While various embodiments of the present technology are shown and described herein, it will be obvious to those skilled in the art that such embodiments are provided by way of example only. Numerous variations, changes, and substitutions may occur to those skilled in the art without departing from the scope of the present technology. It should be understood that various alternatives to the embodiments described herein may be employed.

Whenever the term "at least," "greater than," or "greater than or equal to" precedes the first numerical value in a series of two or more numerical values, the term "at least," "greater than" or "greater than or equal to" applies to each of the numerical values in that series of numerical values. For example, greater than or equal to 1, 2, or 3 is equivalent to greater than or equal to 1, greater than or equal to 2, or greater than or equal to 3.

Whenever the term "no more than," "less than," or "less than or equal to" precedes the first numerical value in a series of two or more numerical values, the term "no more than," "less than," or "less than or equal to" applies to each of the numerical values in that series of numerical values. For example, less than or equal to 3, 2, or 1 is equivalent to less than or equal to 3, less than or equal to 2, or less than or equal to 1.

The term "real time" or "real-time," as used interchangeably herein, generally refers to an event (e.g., an operation, a process, a method, a technique, a computation, a calculation, an analysis, a visualization, an optimization, etc.) performed using recently obtained (e.g., collected or received) data. In some cases, a real time event may be performed almost immediately or within a short enough time span, such as within at least 0.0001 millisecond (ms), 0.0005 ms, 0.001 ms, 0.005 ms, 0.01 ms, 0.05 ms, 0.1 ms, 0.5 ms, 1 ms, 5 ms, 0.01 seconds, 0.05 seconds, 0.1 seconds, 0.5 seconds, 1 second, or more. In some cases, a real time event may be performed almost immediately or within a short enough time span, such as within at most 1 second, 0.5 seconds, 0.1 seconds, 0.05 seconds, 0.01 seconds, 5 ms, 1 ms, 0.5 ms, 0.1 ms, 0.05 ms, 0.01 ms, 0.005 ms, 0.001 ms, 0.0005 ms, 0.0001 ms, or less.

In an aspect, the present disclosure provides a storage tank for storing fuel. The storage tank may be configured to hold a volume of a gaseous or a liquid fuel. The fuel may comprise hydrogen. The hydrogen may comprise liquid hydrogen under high pressure. In some cases, the hydrogen may comprise gaseous hydrogen. In some cases, the hydrogen may comprise both liquid hydrogen and gaseous hydrogen. In some cases, the hydrogen stored in the storage tank may be in a state of matter anywhere along the liquid-gas continuum.

Figure 1:
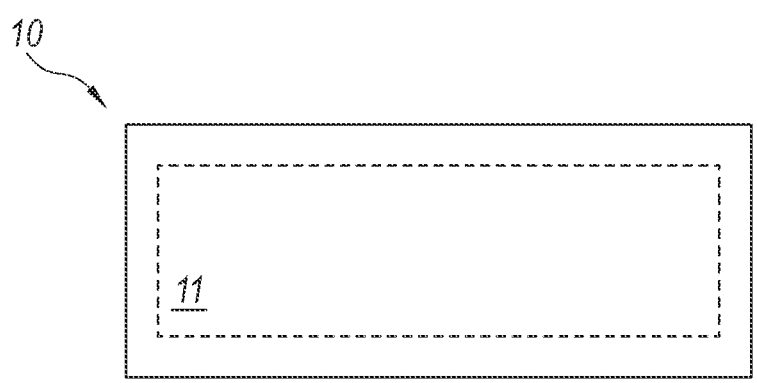
FIG. 1 schematically illustrates a fuel storage tank for storing hydrogen fuel, in accordance with some embodiments.

FIG. 1 schematically illustrates a fuel storage tank 10 for storing hydrogen fuel 11. As described elsewhere herein, the hydrogen fuel 11 may comprise hydrogen in any state of matter along the liquid-gas continuum. In some cases, the storage tank may be configured to store pressurized liquid hydrogen at a cryogenic temperature. As used herein, a cryogenic temperature may refer to a temperature low enough to keep the hydrogen in a stable liquid phase. The storage tank may be a cryogenic storage tank configured to store pressurized liquid hydrogen at a predetermined temperature range. In some cases, the predetermined temperature range may be from about 15 Kelvin to about 30 Kelvin. The fuel storage tank may be configured to shield and insulate the hydrogen fuel stored within the fuel storage tank from changes in temperature or pressure due to external forces or ambient conditions of the environment surrounding the storage tank.

The storage tank may be configured to store the hydrogen for a predetermined amount of time before the hydrogen fuel stored within the storage tank needs to be consumed or vented. The predetermined amount of time may be approximately 80 hours (at standard temperature and pressure) from the time that the storage tank is filled or partially filled with hydrogen fuel. In some embodiments, the amount of time may be in the range of about 40-80 hours without leaking more than a di minimis amount and/or without the need for venting the hydrogen from within the tank. As used herein, standard temperature and pressure (STP) may refer to a standard temperature of 273.15 Kelvin (K) and a standard absolute pressure of either 1 atm (101.325 kiloPascals), or 1 bar (100 kiloPascals).

The storage tank may be filled or refilled with hydrogen produced at a hydrogen production facility. In some cases, the hydrogen may be processed before storage. Processing the hydrogen may comprise a pressurization step, a liquefaction step, and/or a purification step if the processing methods used leave residual impurities or introduce impurities. In some embodiments, the hydrogen may be processed to change a pressure, a temperature, and/or a density of the hydrogen before storage. For example, the hydrogen may be processed (e.g., through a pressurization or liquefaction step) to increase the pressure of the hydrogen, decrease the pressure of the hydrogen, increase the temperature of the hydrogen, decrease the temperature of the hydrogen, increase the density of the hydrogen, and/or decrease the density of the hydrogen for storage and transportation purposes.

In some cases, the hydrogen may be initially supplied to the hydrogen fuel storage tank via a fuel injection port until (i) the pressure of the hydrogen fuel in the fuel storage tank reaches a predetermined pressure threshold or (ii) the mass of the hydrogen fuel reaches a predetermined mass threshold. A control module may be configured to monitor the pressure and/or mass of the hydrogen fuel and to shut off the supply of the hydrogen fuel to the fuel storage tank when the pressure and/or mass of the hydrogen fuel in the storage tank reaches a predetermined threshold value.

The hydrogen storage tank in accordance with the present technology may have a variety of form factor. For example, the hydrogen storage tank may be sized, shaped, and/or configured such that the storage tank conforms to an inner volume of a hydrogen fuel compatible vehicle when inserted or loaded into the hydrogen fuel compatible vehicle. The hydrogen storage tank may also be sized, shaped, and/or configured to interface with one or more structural components or features of a transportation vehicle to facilitate the transport or delivery of said storage tank from a hydrogen production facility to one or more hydrogen fuel compatible vehicles or vehicle fueling sites.

The hydrogen storage tank may comprise a vertical cross-section and a horizontal cross-section. The vertical cross-section may comprise a first shape. The horizontal cross-section may comprise a second shape. The first shape and/or the second shape may comprise a circle, an ellipse, a triangle, a square, a rectangle, a pentagon, a hexagon, a heptagon, an octagon, or any polygon having three or more sides. In some cases, the first shape and/or the second shape may comprise a regular polygon having two or more sides with a same length. In some cases, the first shape and/or the second shape may comprise an irregular polygon having two or more sides with different lengths. In some cases, the first shape and/or the second shape may comprise an irregular or amorphous shape. The irregular or amorphous shape may comprise any closed shape having at least one curve or edge. In some cases, the first shape may be similar or identical to the second shape. In other cases, the first shape and the second shape may not or need not be similar or identical.

In some embodiments, the hydrogen storage tank may comprise a plurality of vertical cross-sections and a plurality of horizontal cross-sections. In some cases, the plurality of vertical cross-sections may comprise two or more vertical cross-sections with different sizes, shapes, or areas. In some cases, the plurality of horizontal cross-sections may comprise two or more horizontal cross-sections with different sizes, shapes, or areas. In some cases, the plurality of vertical cross-sections and the plurality of horizontal cross-sections may be similar or identical. Alternatively, the plurality of vertical cross-sections and the plurality of horizontal cross-sections may not or need not be similar or identical.

Figure 2A:
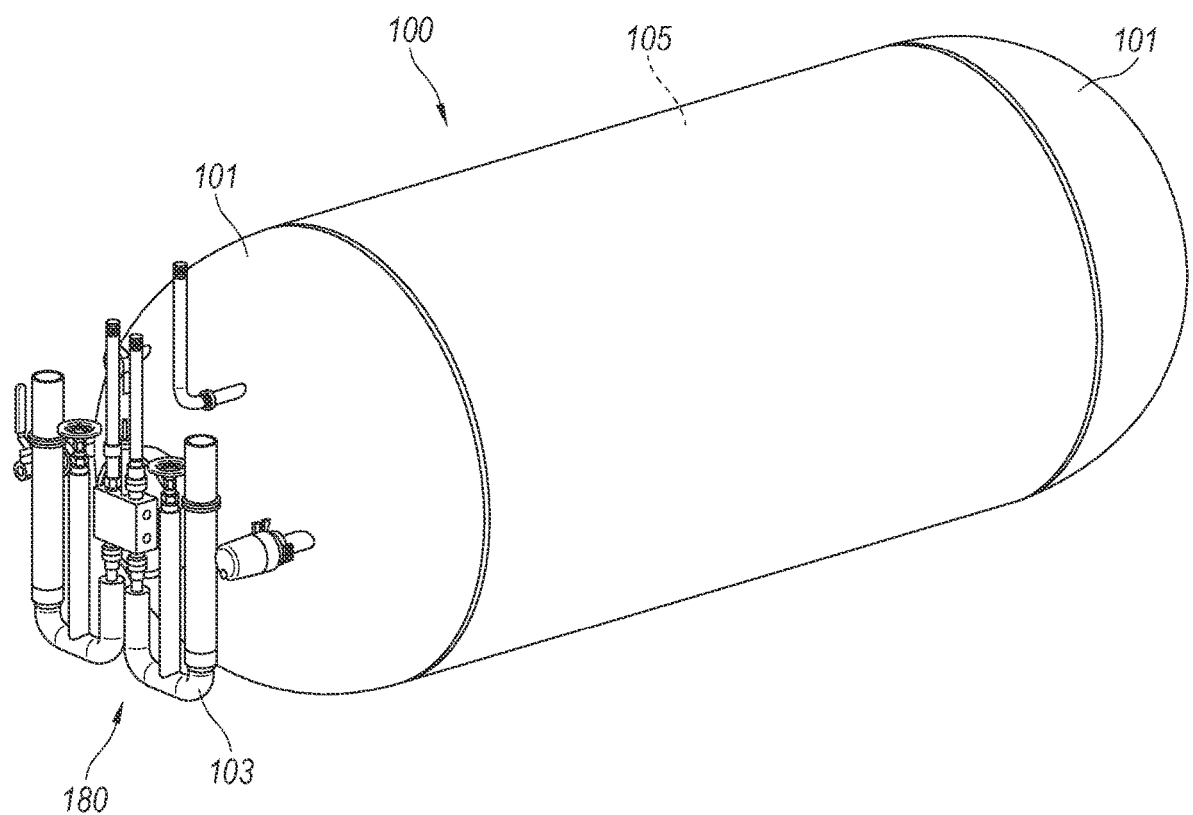
FIG. 2A and FIG. 2B schematically illustrate a cylindrical fuel storage tank with hemispherical ends, in accordance with some embodiments.
Figure 2B:
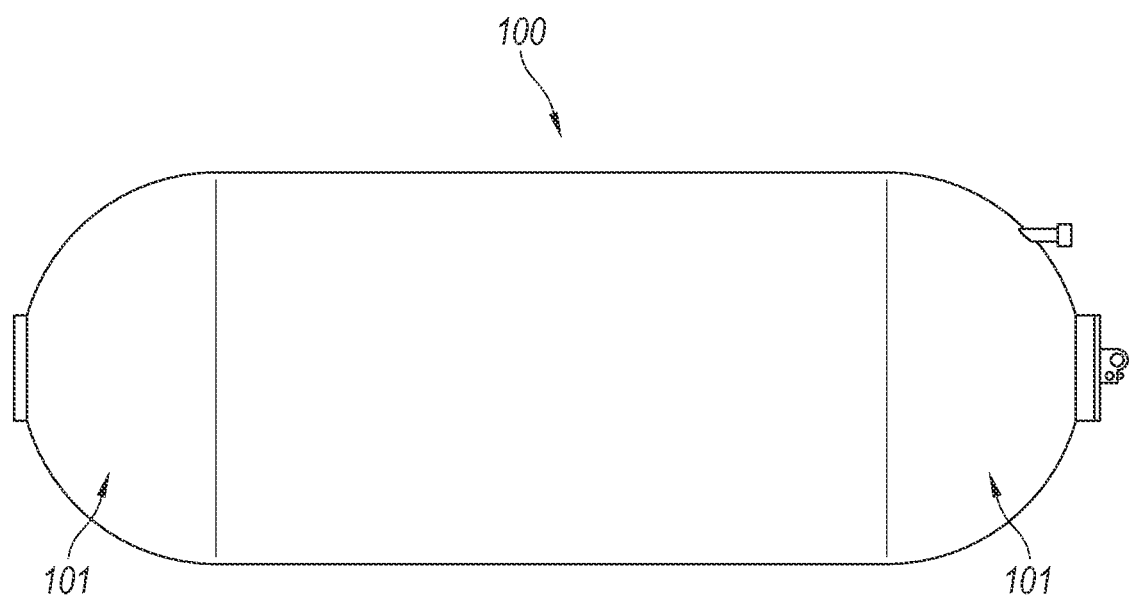
Figure 3A:
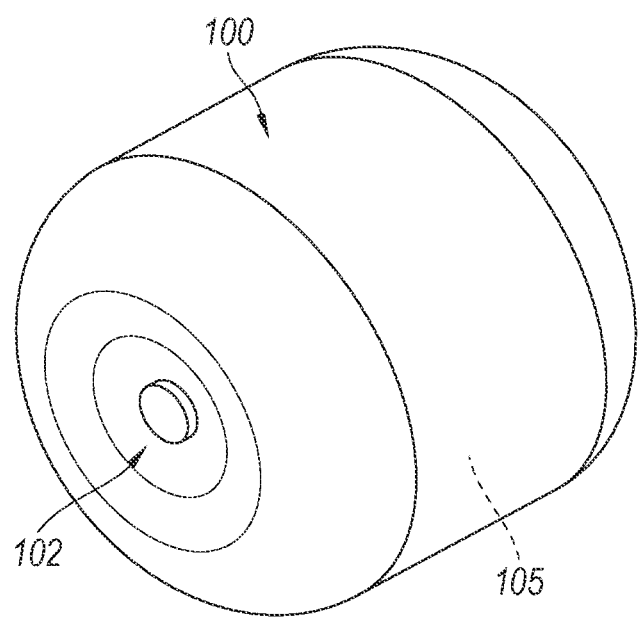
FIG. 3A schematically illustrates a cylindrical fuel storage tank with dimpled ends, in accordance with some embodiments.
Figure 3B:
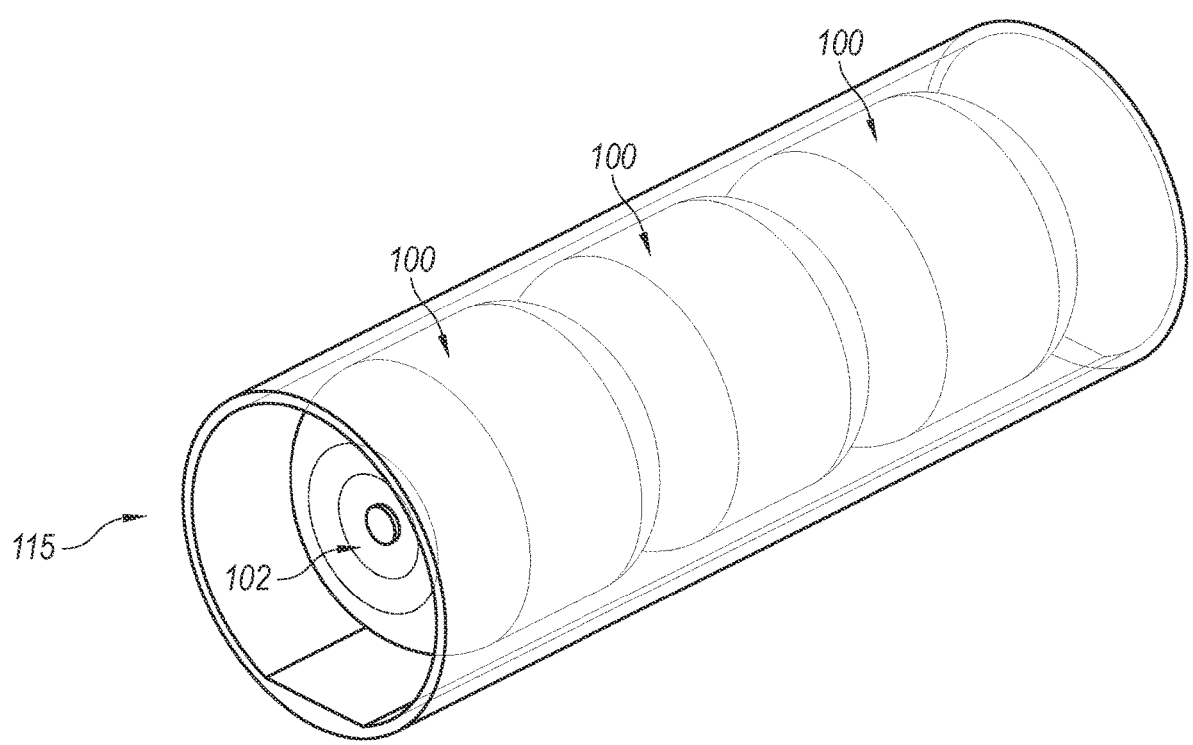
FIG. 3B schematically illustrates a plurality of fuel storage tanks with dimpled ends that are stacked together in series, in accordance with some embodiments.

In some embodiments, the liquid hydrogen storage tank may be shaped as a cylinder. As shown in FIGS. 2A and 2B, in some cases the cylindrical storage tank 100 may comprise hemispherical ends 101. In other cases, the ends of the cylinder may be domed, partially spherical, conical, or any combination thereof. As discussed in greater detail below, fluid lines 103 (FIG. 2A) can be connected to one or both ends 101 of the tank 100 and in communication with the interior 105 of the tank 100. In another embodiment, as shown in FIG. 3A, the liquid hydrogen storage tank 100 may be shaped as a cylinder with dimpled ends 102. As used herein, a dimpled end may refer to a top or bottom end of a cylindrical storage tank with one or more dimples, depressions, impressions, or indentations. The dimpled ends 102 may allow a plurality of storage tanks to be stacked together in series with a greater volumetric efficiency than when a plurality of cylindrical tanks having hemispherical ends are stacked together in series. As shown in FIG. 3B, a plurality of hydrogen storage tanks 100 with dimpled ends 102 may be stacked together in series within an aircraft fuselage 115. The shape of the cylindrical tanks 100 with dimpled ends 102 can provide a significantly lighter structural weight compared to a volumetrically equivalent cylindrical pressure vessel with flat ends.

Figure 4A:
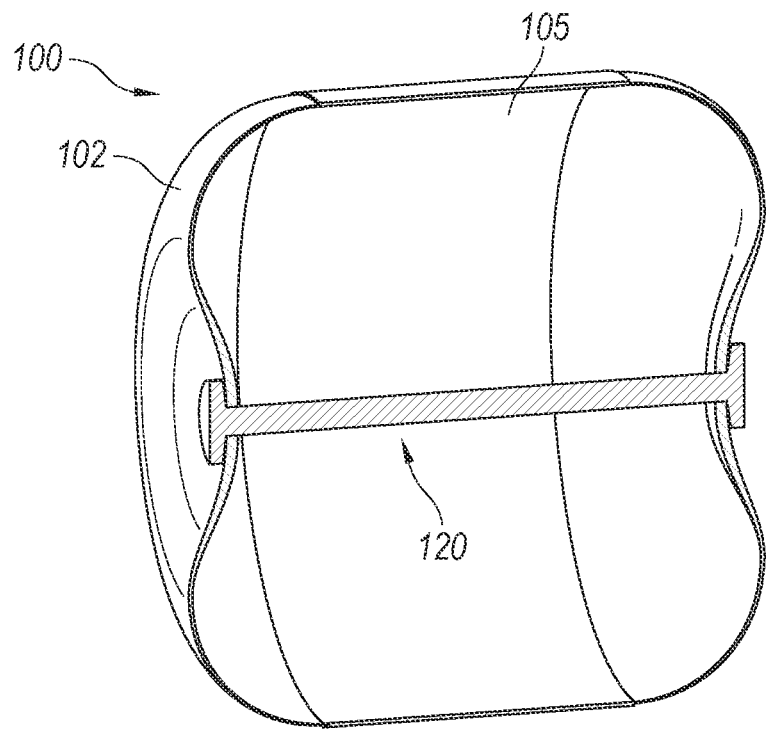
FIG. 4A and FIG. 4B schematically illustrate a storage tank with a tie rod, in accordance with some embodiments.
Figure 4B:
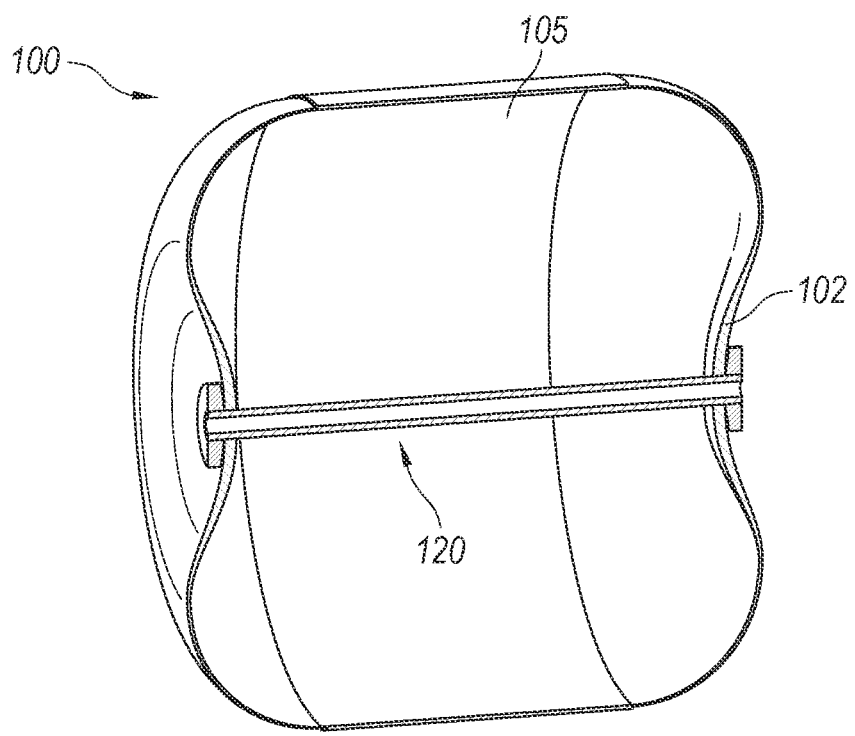

As shown in FIG. 4A and FIG. 4B, the liquid hydrogen storage tank 100 may have a tie rod 120. The tie rod 120 may comprise a slender structural member capable of carrying tensile loads. The tie rod 120 may be configured to physically connect a first portion of the liquid hydrogen storage tank to a second portion of the liquid hydrogen storage tank. The first portion and the second portion may be located on opposite ends of the storage tank. The tie rod 120 may extend from a first dimpled end 102 of the storage tank to a second dimpled end 102 of the storage tank. The tie rod 120 may be configured to alleviate and redistribute the structural loads exerted on the storage tank 100 or an internal layer of the storage tank (e.g., a first layer of storage tank, which may comprise a pressure vessel as described in greater detail below). As such, the storage tank 100 may not need any additional structural members to manage pressure loads, which may result in a lighter tank.

The tie rod 120 may comprise one or more aluminum alloys, steel alloys, carbon fiber, fiberglass, or any combination thereof. In some cases, the tie rod may comprise a solid member. In other cases, the tie rod 120 may comprise a hollow member with an internal cavity. In any case, the tie rod may comprise a single material or a plurality of different materials. In other embodiments, such as a cylindrical tank 100 with hemispherical ends 101, a tie rod may not be used or needed to provided additional structural support for the tank.

Figure 5A:
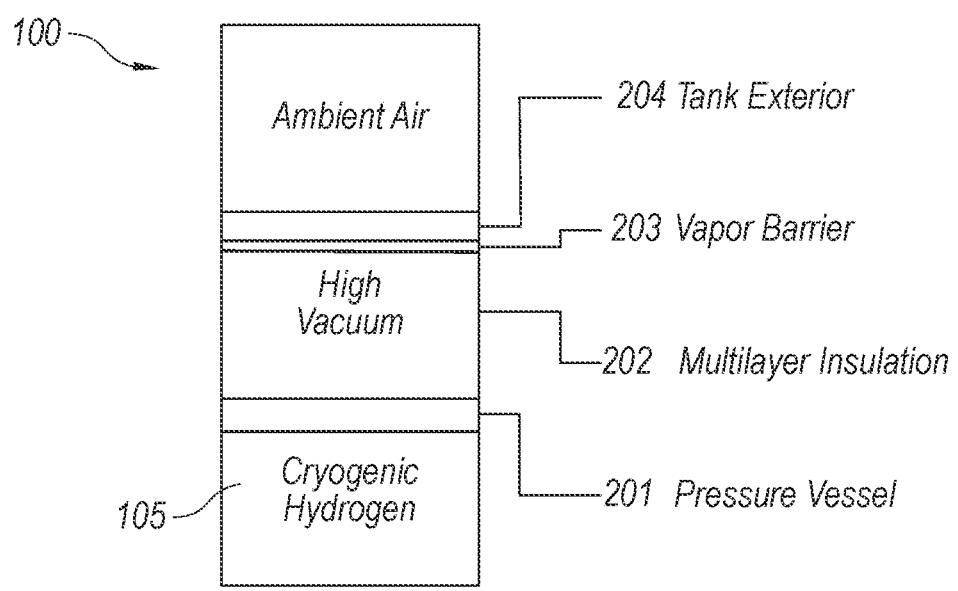
FIG. 5A schematically illustrates a storage tank comprising a plurality of layers, in accordance with some embodiments.
Figure 5B:
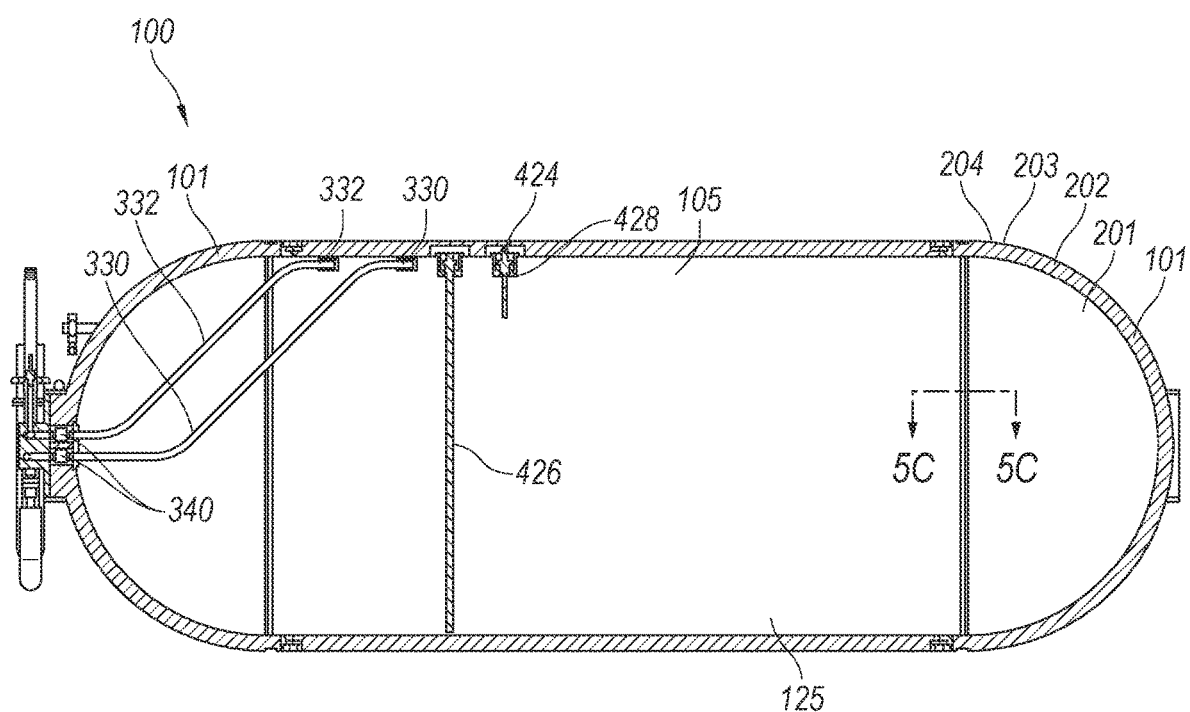
FIG. 5B is a cross-sectional view of a storage tank in accordance with some embodiments.
Figure 5C:
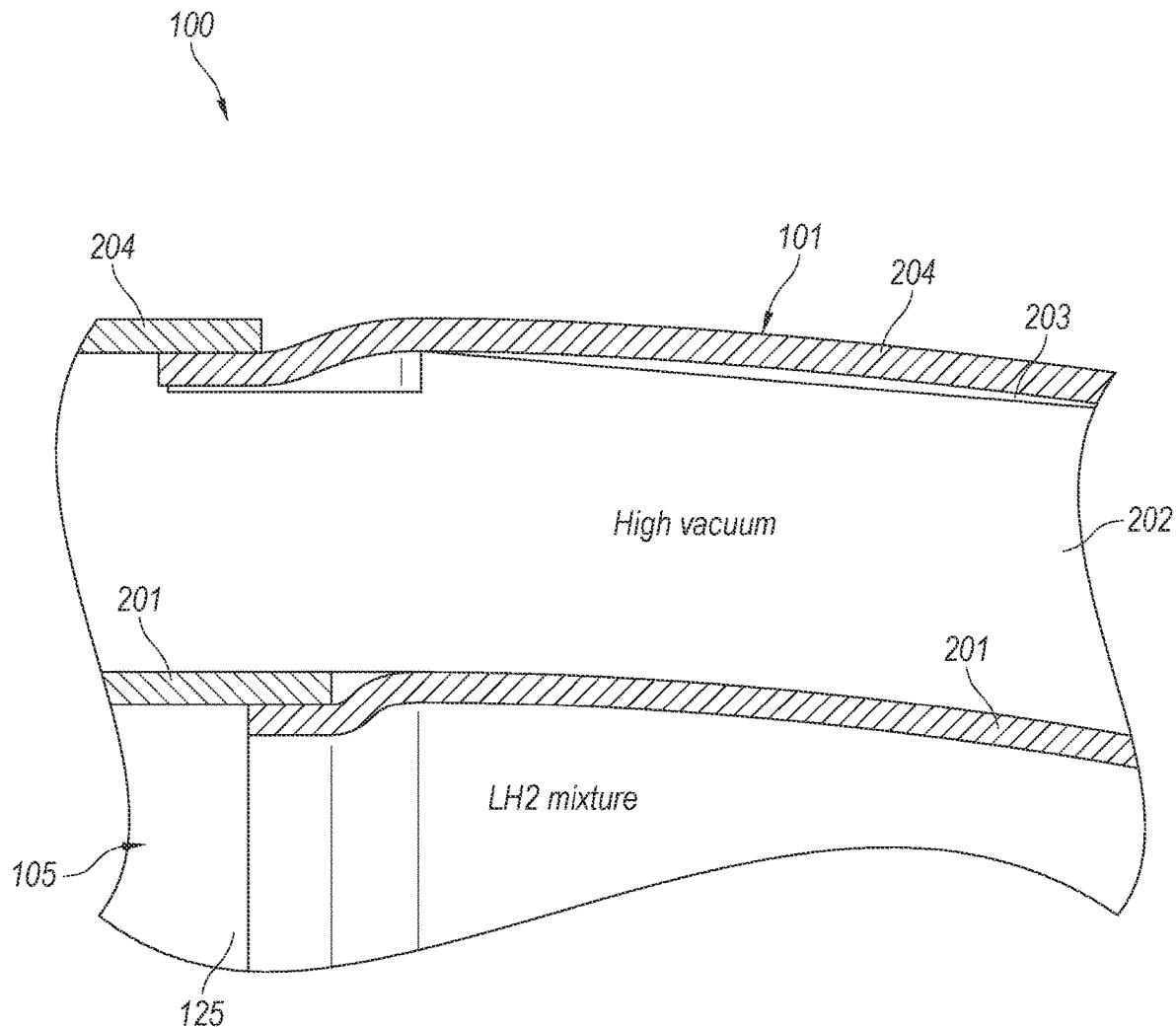
FIG. 5C is an enlarged cross-sectional view taken substantially along line 5C-5C of FIG. 5B.

The liquid hydrogen storage tank 100 may comprise multiple layers, as depicted in FIGS. 5A-5C. The plurality of layers and/or materials may each be configured or optimized to perform one or more functions (e.g., insulation, impact resistance, or carrying pressure loads). In some cases, the plurality of layers and/or materials may be configured or optimized to perform multiple functions (e.g., insulation, impact resistance, and carrying pressure loads).

In the illustrated embodiment, the liquid hydrogen storage tank 100 has an interior first layer 201 that defines the tank's inner shell around the interior area 105 and acts as a pressure vessel designed to contain the pressurized liquid hydrogen. The first layer 201 may comprise aluminum alloys, steel alloys, carbon fiber, other fiber-reinforced composite material and/or a combination of materials. In at least one embodiment, the inner layer 201 is formed of an aluminum 6061 layer having a thickness of about 2.5 mm.

The liquid hydrogen storage tank 100 may further comprise a second layer 202 spaced radially outward of the first layer 201. The second layer 202 may comprise an insulation layer configured to minimize heat transfer between the tank surroundings and the cryogenic hydrogen stored within the storage tank. The insulation layer may comprise alternating sheets of spaced superinsulation to minimize heat transfer due to thermal radiation. The insulation layer may also be held at a high vacuum to minimize heat transfer due to thermal conduction and convection. In one embodiment, the volume containing the insulation layer is held at a vacuum of approximately 7.5E-6 Torr, although other embodiments can hold the space containing the insulation at different vacuum levels. The spaced superinsulation may comprise multiple layers of glass fiber fleece spacer interleaved with multiple layers of pure aluminum foil. The layers of glass fiber fleece spacer and pure aluminum foil may be held together using connectors or an adhesive. The spaced superinsulation may have a nominal compressed thickness of about 5.0 millimeters (mm) per 10 layers. In one embodiment, the spaced superinsulation comprises a multilayer insulation with approximately eighteen layers of metal foil interleaved with eighteen layers of fiber spacer, wherein the insulation has a thickness of approximately 25 mm. The insulation in other embodiments can have other materials, other configurations, other layer arrangements, and/or other thicknesses.

The liquid hydrogen storage tank 100 may further comprise a third layer 203 configured as a vapor barrier spaced radially outward of the second layer 202. The third layer 203 may be configured to control or prevent the diffusion of vapors or moisture out of the tank 100 through the third layer. The third layer 203 may have a permeability that prevents the diffusion of vapors or moisture through the third layer. The vapor barrier may comprise, for example, mylar, an aluminum alloy, glass fiber composite, or any combination thereof. In the illustrated embodiment, the second layer 202 is positioned between the first and third layers 201 and 203. In other embodiments the vapor barrier (e.g., the third layer 203) may be positioned between the first and second layers 201 and 202. In yet other embodiments a separate vapor barrier is not used, and the pressure vessel and/or the outer shell of the tank are configured to act as a vapor barrier that blocks transmission of hydrogen through the tank.

The liquid hydrogen storage tank 100 may further comprise a fourth layer 204 that comprises an exterior shell configured to provide structural support and maintain rigidity in the internal support structures of the storage tank. The fourth layer 204 may also provide abrasion resistance and/or impact resistance. In some embodiments, the fourth layer 204 may provide for a robust outer surface for handling and accepting fittings. The fourth layer 204 may comprise, for example, an aluminum alloy, a steel alloy, carbon fiber, other fiber-reinforced composite material, and/or a combination of materials.

In any of the embodiments described herein, the thickness and composition of each layer may be optimized. For example, the thickness and composition of each layer may be adjusted to maximize (i) the mass fraction of fuel mass to storage tank mass or (ii) the volumetric efficiency of the storage tank. The thickness and composition of each layer may be optimized based at least in part on a liquid hydrogen hold time constraint. The hold time constraint may correspond to an amount of time that elapses from the filling or refilling of the storage tank before the contents stored within the storage tank need to be consumed or vented. In some cases, the thickness and composition of each layer may be optimized based at least in part on certain performance requirements (e.g., internal load management, impact resistance, insulation performance, etc.) for the storage tank or the plurality of layers within the storage tank.

In the illustrated embodiment, the hydrogen fuel (e.g., liquid hydrogen) is contained within the tank's interior area 105 so that the hydrogen is pressurized within a selected pressure range, such as approximately 4-6 bar or preferably up to approximately 5 bar. Accordingly, the first layer 201 of the tank 100 forms a pressure layer or vessel 125. The pressure vessel 125 is subject to the low temperatures of cryogenic hydrogen, which can cause thermal contraction of the pressure vessel 125 relative to the tank's outer shell 204. In the illustrated embodiment, the pressure vessel 125 is supported within outer shell 204 in a manner to account for thermal contraction or expansion, as well as to control thermal transfer from the pressure vessel 125 to the outer shell 204. In at least one embodiment, the pressure vessel 125 is supported from or within the outer shell 204 by a plurality of tank retention strap assemblies coupled between the inner pressure vessel 125 and the outer shell 204.

Figure 6:
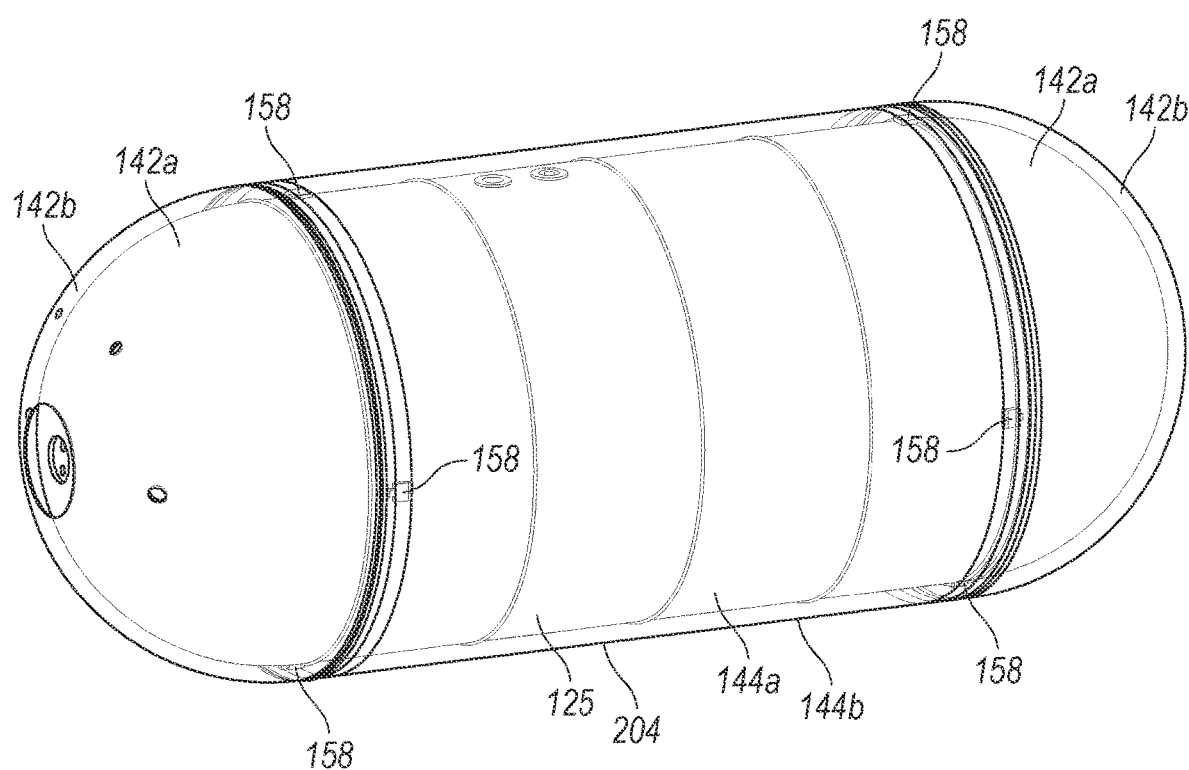
FIG. 6 is a schematic isometric view of a fuel storage tank in accordance with some embodiments, wherein the exterior layer (i.e., outer shell) is illustrated translucently to show the inner pressure vessel and a plurality of tank retention strap assemblies.
Figure 7:
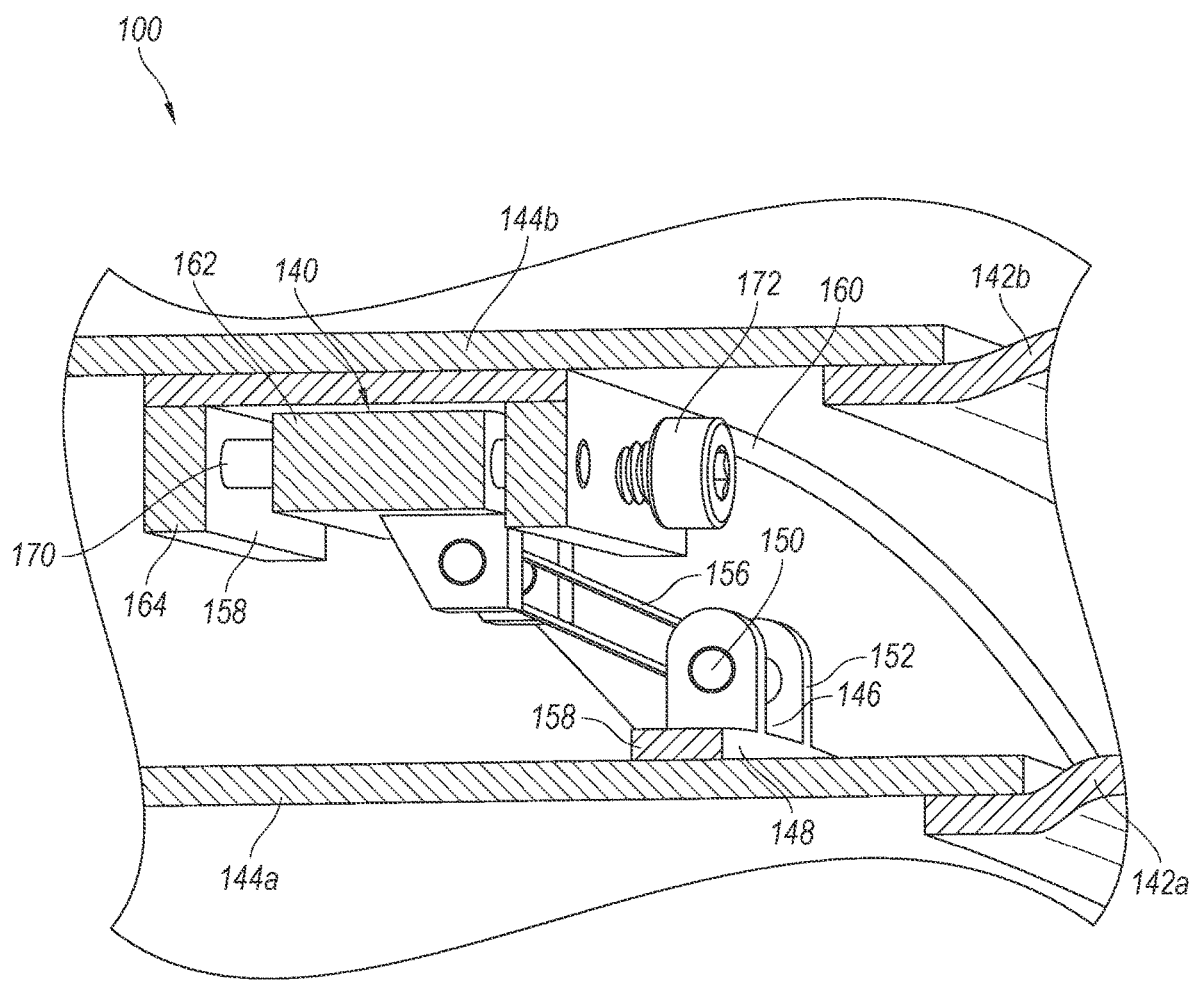
FIG. 7 is an enlarged isometric view of a tank retention strap assembly of FIG. 6.
Figure 8:
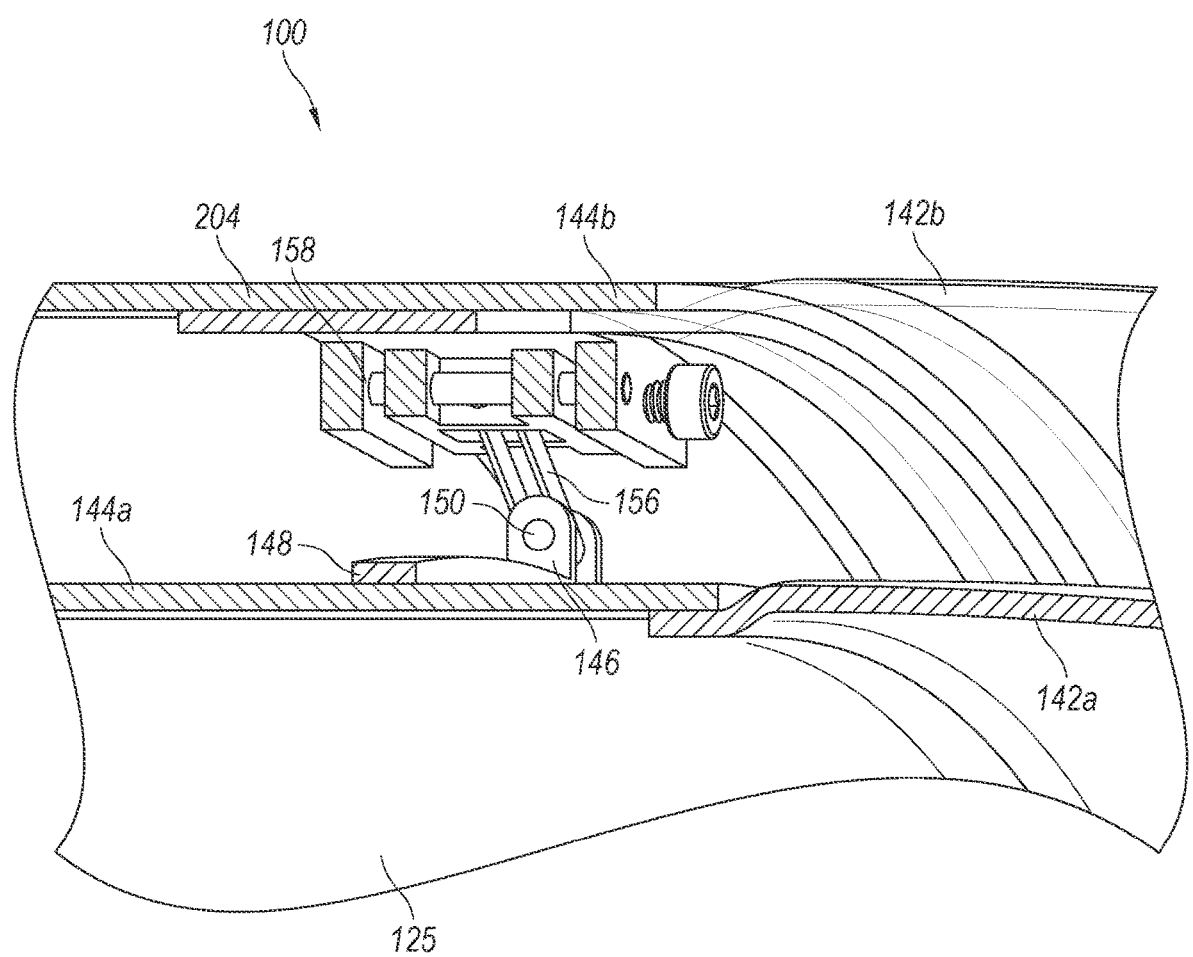
FIG. 8 is an enlarged isometric view of a tank retention strap assembly of FIG. 6 in another position.

FIG. 6 is a schematic isometric view of a fuel storage tank 100 in accordance with an embodiment, wherein the outer shell 204 is illustrated translucently to show a plurality of internal, adjustable retention strap assemblies 140 between the outer shell 204 and the inner pressure vessel 125. FIGS. 7 and 8 are enlarged isometric views of a tank retention strap assembly 140 in first and second positions relative to the pressure vessel 125.

In the illustrated embodiment, the fuel storage tank 100 has the pressure vessel 125 supported within the outer shell 204. Each of the pressure vessel 125 and the outer shell 204 has a pair of hemispherical end portions 142a/142b welded onto opposing ends of a cylindrical body portion 144a/144b. A plurality of retention strap assemblies 140 are positioned at each end of the body portions 144a/144b. The retention strap assemblies 140 are secured to the pressure vessel 125 and the outer shell 204 about the circumference of the body portion 144a/144b adjacent to the respective hemispherical end portion 142a/142b. In one or more embodiments, four retention strap assemblies 140 are distributed equally around the circumferences of the body portions 144a/144b at each end of the body portion. Accordingly, the fuel storage tank 100 has a total of eight retention strap assemblies 140 (four on each end of the body portion). Other embodiments can have a greater or fewer number of retention strap assemblies 140 between the pressure vessel 125 and the outer shell 204.

As best seen in FIG. 7, each retention strap assembly 140 of the illustrated embodiment has an anchor member 146 extending radially from the outer surface of the pressure vessel 125 and into the space between first and third layers 201 and 203 (FIG. 5A). In one embodiment, each anchor member 146 is integrally or otherwise connected to an inner girth ring 148 secured around the perimeter of the pressure vessel's body portion 144a. The inner girth ring 148 can be a machined aluminum ring welded to the respective end area of the pressure vessel's body portion 144a. The anchor member 146 of the illustrated embodiment has an anchor pin 150 extending between a pair of spaced-apart flanges 152 coupled to the inner girth ring 148. A strap 156 extends around the anchor pin 150 and is captured between the flanges 152. The strap 156 can be non-stretchable material with minimal thermal conductivity, thereby providing a thermal break between the pressure vessel 125 and the outer shell 204. In some embodiments, the strap 156 can be a Kevlar-epoxy material, such as a unidirectional Kevlar-49 CYCOM 950-1 strap. Other embodiments can use fiberglass material, carbon fiber material, carbon fiber composite material, fiber reinforced material, or other suitable materials.

The retention strap assembly 140 also has an anchored adjustment unit 158 extending radially from the inner surface of the outer shell 204 and into to the space between the outer shell 204 and the pressure vessel 125. In one embodiment, each anchored adjustment unit 158 is integrally or otherwise connected to an outer girth ring 160 secured around the inner surface of the outer shell's body portion 144b. The outer girth ring 148 can be a machined aluminum ring welded to the respective end area of the outer shell's body portion 144a. The anchored adjustment unit 158 of the illustrated embodiment has an adjustable carriage 162 movably mounted to a frame 164 that is connected to the outer girth ring 160. The adjustable carriage 162 has an outer anchor pin 166 extending between a pair of spaced-apart carriage flanges 168. The strap 156 extends around the upper anchor pin 166 and is captured between the carriage flanges 152. Accordingly, the non-stretchable, non-thermally conductive strap 156 is securely fixed to and extends between the anchored adjustment unit 158 and the inner anchor member 146.

The adjustable carriage 162 is moveable relative to the frame 164 to adjust the distance between carriage 162 (i.e., the outer anchor pin 166) and the inner anchor member 146 (i.e., the inner anchor pin 150), thereby adjusting and controlling the position of the pressure vessel 125 relative to the outer shell 204. Adjustment of the carriage 162 also controls the tension in the respective strap 156. In the illustrated embodiment, the carriage 162 is translatably mounted on a support member 170 connected to an adjustment screw 172. The adjustment screw 172 is adjustable to move the carriage 162 along the support member 170 relative to the frame 164, thereby adjusting the tension in the strap 156 or the position of the pressure vessel 125 relative to the outer shell 204. For example, FIG. 7 shows the anchored adjustment unit 158 supporting the pressure vessel 125 in a first position relative to the outer shell 204, and FIG. 8 shows the anchored adjustment unit 158 adjusted to another position to support the pressure vessel 125 in a second position relative to the outer shell 204.

In the illustrated embodiment, each anchored adjustment unit 158 is positioned so that the carriage 162 is movable in a direction parallel with the longitudinal axis of the fuel storage tank 100. The anchored adjustment units 158 are positioned adjacent to the ends of the cylindrical body portions 144a/144b. During assembly, the body 144a of the pressure vessel 125 is positioned within and spaced radially apart from the outer shell 204 before the hemispherical end caps 144a/144b are welded or otherwise fixed to the respective body portions 142a/142b. Accordingly, before the hemispherical end caps 144a/144b are installed, the adjustment screws 172 of the anchored adjustment units 158 are accessible and adjustable to fix and securely retain the axial and radial positions of the pressure vessel 125 relative to the outer shell 204. This configuration allows the anchored adjustment units 158 to be positioned so as to minimize and distribute stresses on the pressure vessel. The adjustment units also accommodate loads or stresses on the pressure vessel containing the liquid hydrogen while restricting relative movement of the pressure vessel within the outer shell, such as during use or movement of the fuel storage tank 100. The anchored adjustment units 158 and the strap 156 are also configured to selectively allow for thermal contraction and/or expansion due to the low temperatures of the cryogenic liquid hydrogen and the changing conditions due to use, for example, consumption of the hydrogen fuel, refilling of the fuel storage tank, and/or variations in ambient conditions to which the fuel storage tank 100 may be exposed during use. During this expansion and/or contraction, the strap 156 maintains a constant length and is configured to pivot about the respective anchor member 146 and/or the anchored adjustment unit 158 while maintaining a constant tension in the strap 156.

As indicated above, the anchored adjustment units 158 are located in the space between the pressure vessel 125 and the outer shell 240, and a high vacuum is drawn within this space. In addition to the insulation in the space and the thermally insulative effects of the high vacuum environment, the thermally non-conductive straps 156 create a thermal break between the pressure vessel 125 and the outer shell 204. Accordingly, the cryogenic conditions in the pressure vessel are controlled so as to have a limited impact on the outer shell 204 of the fuel storage tank 100.

It is to be noted that, in the illustrated embodiment, the adjustable portion of the retention strap assembly 140 is attached to the outer shell 204, and the anchor member 146 is attached to the pressure vessel 125. In other embodiments, however, the arrangement can be inverted, wherein the adjustable portion of the retention strap assembly 140 may be attached to the pressure vessel 125, and the anchor member 146 may be attached to the outer shell 204. In another embodiment, some of the retention strap assemblies 140 can have the adjustable portion attached to the outer shell 204, while other ones of the retention strap assemblies can have the adjustable portion attached to the pressure vessel 125.

Figure 9A:
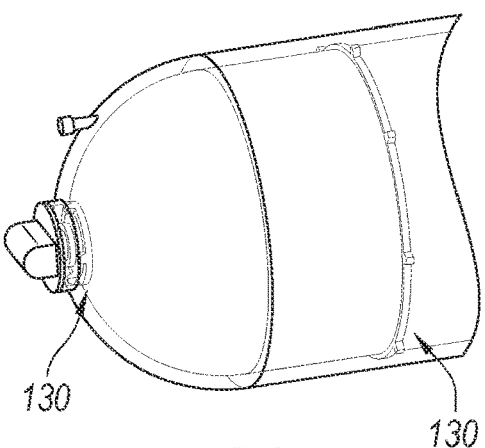
FIG. 9A, FIG. 9B, and FIG. 9C schematically illustrate a crenelated ring that may be inserted between two or more layers of a storage tank, in accordance with some embodiments.
Figure 9B:
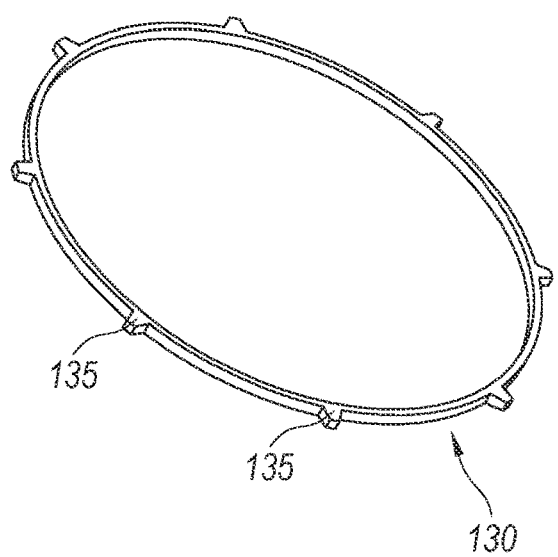
Figure 9C:
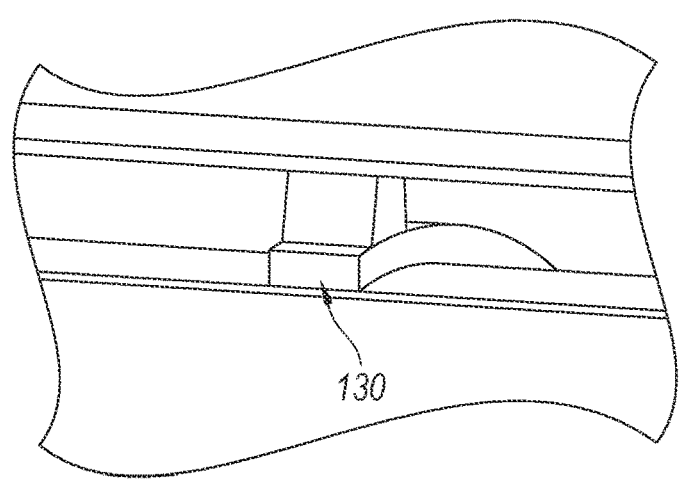

In one or more other embodiments, the pressure vessel 125 can be supported relative to the outer shell 204 with other structures. For example, FIG. 9A, FIG. 9B, and FIG. 9C schematically illustrate a crenelated ring that may be inserted between two or more layers of a storage tank, in accordance with some embodiments to support the pressure vessel 125 within the outer shell 204. The crenelated rings 130 may be inserted in between any two or more layers of the storage tank. The crenelated rings 130 may comprise a ring with one or more crenellations 135 disposed on an outer edge of the ring. The one or more crenellations 135 may comprise a raised feature (e.g., a bump or an extrusion) that extends from the outer edge of the rink. In some cases, the one or more crenellations 135 may comprise a curved shape or profile that conforms with an internal curvature of the inner walls of the fourth layer of the storage tank. In other cases, the one or more crenellations 135 may comprise a flat or substantially flat surface profile. In some cases, the one or more crenellations 135 may be disposed in a periodic pattern along an outer edge of the ring 130. In such cases, the one or more crenellations 135 may be spaced at equal angular intervals relative to one other. In other cases, the one or more crenellations 135 may be arranged in a non-periodic pattern along the outer edge of the ring 130. In such cases, the one or more crenellations 135 may be placed at different angular distances relative to each other. In any of the embodiments described herein, the crenellations 135 may be added on each ring 130 to limit a contact area between the first and fourth layers of the storage tank, thereby minimizing thermal conduction between said layers. The support rings 130 may also serve as an anchor point on which to lay up and fasten the insulation layer (i.e., the second layer of the storage tank). In some embodiments, the crenelated rings 130 may comprise fiberglass.

Figure 10:
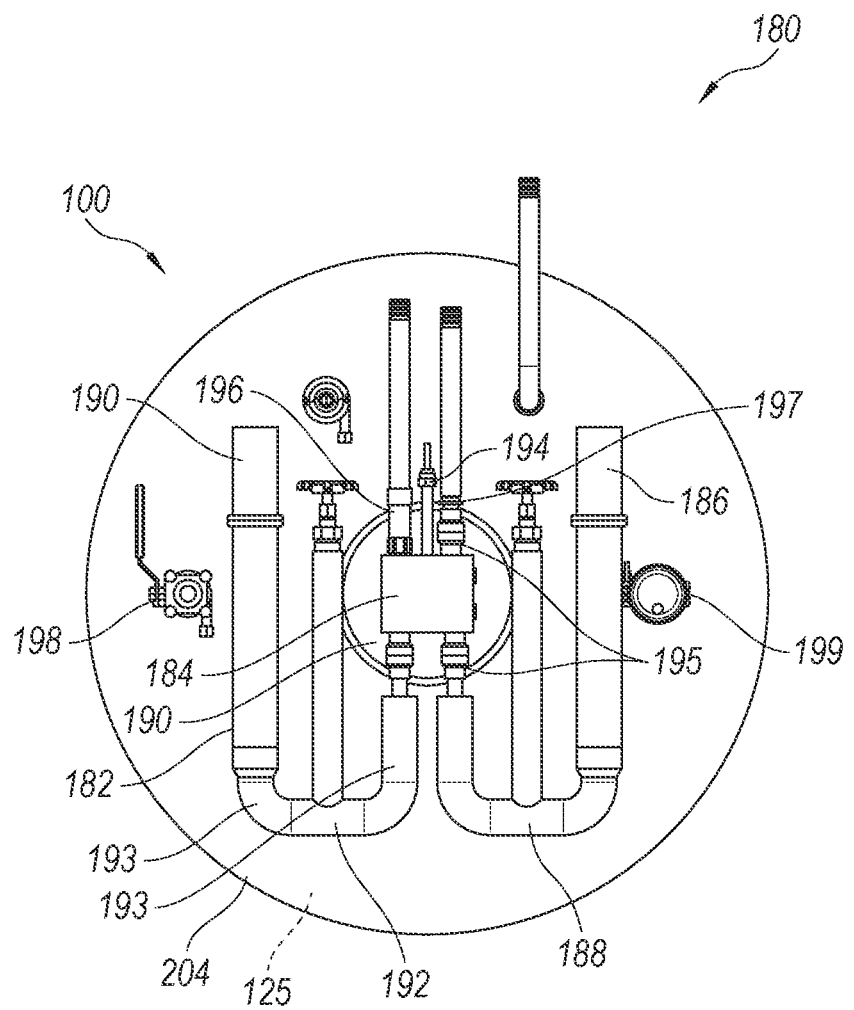
FIG. 10 is an end view of the fuel storage tank of FIG. 2A showing a plumbing configuration with exterior lines in accordance with an embodiment.

The fuel storage tank 100 is configured to allow for the controlled flow of the fuel, such as hydrogen, to pass into and out of the tank through a plumbing system. FIG. 10 is an end view of the fuel storage tank of FIG. 2A showing a plumbing system 180 in accordance with at least one embodiment. The plumbing system 180 communicates with the internal volume of the tank within the pressure vessel 125 to allow flow of the hydrogen fuel into the tank (i.e., during refueling). The plumbing system also allows for a controlled flow of hydrogen fuel out of the tank for use by a fuel cell, motor, powertrain, or other hydrogen-powered or consuming component. The plumbing system 180 is also configured for control and management of the pressure within the pressure vessel 125 in the fuel storage tank 100. The plumbing system 180 of the illustrated embodiment is coupled to a boss 182 that is connected to an end of the fuel storage tank 100. As used herein, a boss 182 may refer to a protrusion or raised feature on a surface of the fuel storage tank 100. The boss 182 of the illustrated embodiment is rigidly and sealably connected to the outer shell 204 and to the interior pressure vessel 125. The boss 182 connects to the plumbing system 180 and is configured to provide secure and sealed pathways into the pressure vessel 125.

In the illustrated embodiment, the plumbing system 180 comprises a manifold structure 184 connected to a fill line 186 coupleable to a source of hydrogen fuel, such as liquid hydrogen. The fill line 186 is connected to a shut-off valve 188, such as a manual and/or automatic shut off valve that can control the flow of hydrogen through the fill line 186 to the manifold structure 184. A vacuum gauge sensor 189 can be removably or permanently attached to the fill line 186 to monitor conditions in the fill line 186. The manifold structure 184 is also connected to a hydrogen outlet line 190 that receives hydrogen fuel from within the pressure vessel 125 and that directs the hydrogen fuel to fuel lines coupled to the fuel cell, motor, powertrain, or other hydrogen-powered or consuming component. The outlet line 190 is also connected to a shut-off valve 192, such as a manual and/or automatic shut off valve that can control the flow of hydrogen from the fuel tank 100. In the illustrated embodiment, the fill line 184 and the outlet line 190 can be insulated and can include vacuum-jacketed piping 193 and fittings 195, such as bimetallic fittings with high energy metals suitable for the low temperatures associated with the hydrogen fuel in either liquid and/or gaseous states.

The plumbing system 180 of the illustrated embodiment can include a pressure sensor 194 and a pressure relieve valve 196 coupled to the manifold structure 184 to allow for pressure relief if the pressure within the pressure vessel exceed a selected level, such as about 5 bar or other selected pressure level. A burst disc 197 can also be coupled to the manifold structure 184 to protect against an over pressure condition in the plumbing system 180, such as during a hydrogen fill process. In one embodiment, the burst disc 197 can be configured to release at a selected over pressure, such as approximately 7.5 bar or other selected level. In other embodiments, other burst discs or other over-pressure devices can be provided for over-pressure management. The plumbing system 180 can also include a vacuum service port 198 in communication with the interior area of the pressure vessel 125. The vacuum service port 198 can include a manual and/or automatic shutoff control 199.

Figure 11A:
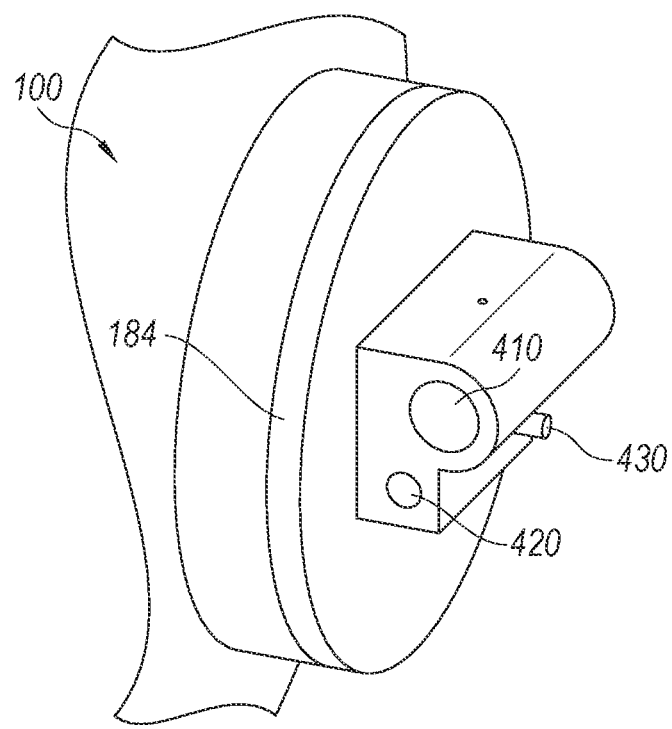
FIG. 11A and FIG. 11B schematically illustrate a main outlet and a breather outlet of a boss of the storage tank, in accordance with some embodiments.
Figure 11B:
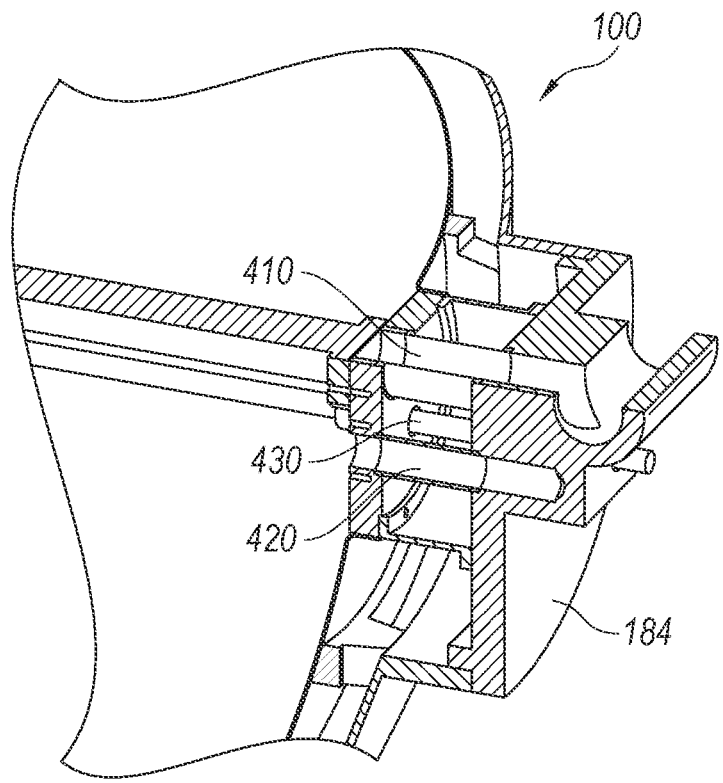
Figure 12:
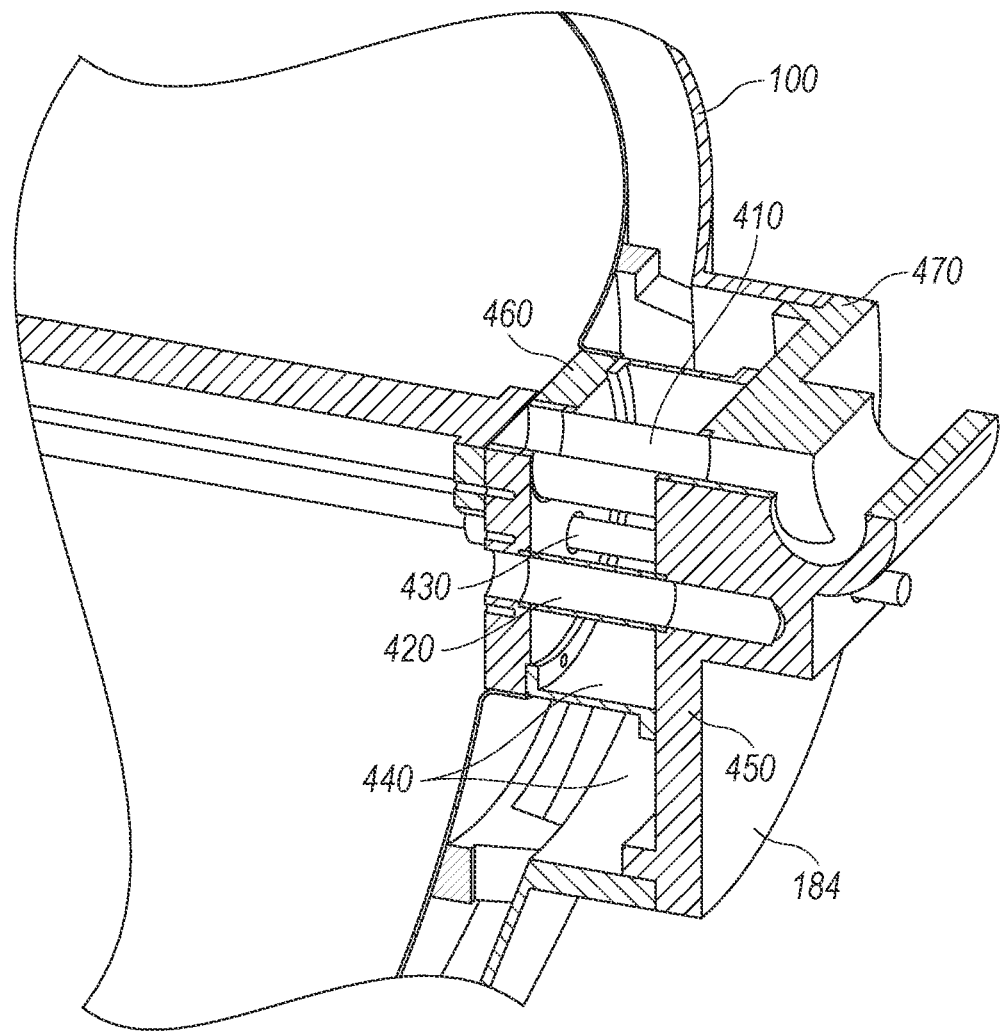
FIG. 12 schematically illustrates a support tube configured to bear the structural loads between an inner cap and an outer cap of a boss of the storage tank, in accordance with some embodiments.
Figure 13:
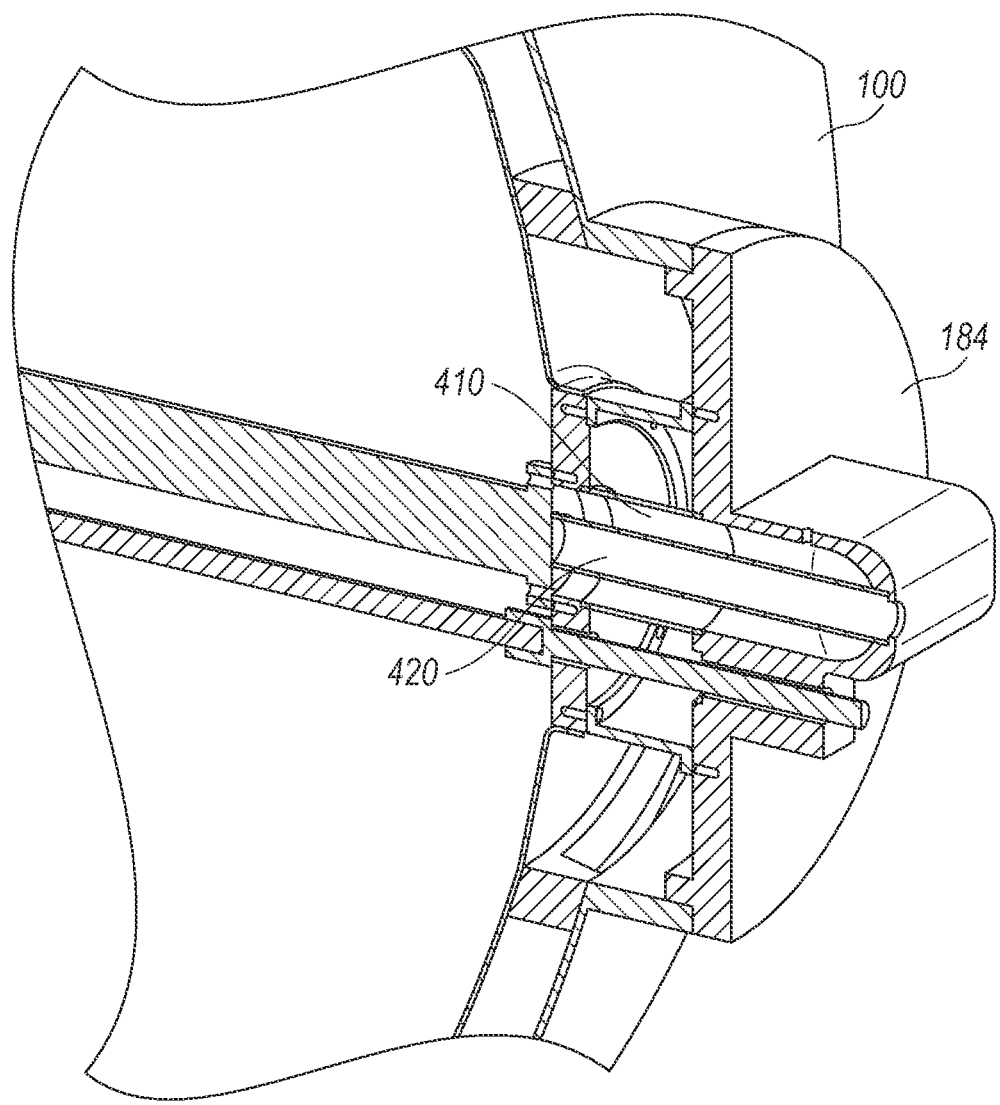
FIG. 13 schematically illustrates a breather outlet positioned within a main outlet of the storage tank, in accordance with some embodiments.

FIG. 11A and FIG. 11B schematically illustrate a main outlet and a breather outlet of the boss 182 of the storage tank 100, in accordance with some embodiments. FIG. 12 schematically illustrates a support tube configured to bear the structural loads between an inner cap and an outer cap of the boss 182 of the storage tank 100, in accordance with some embodiments. FIG. 13 schematically illustrates a breather outlet positioned within a main outlet of the storage tank 100, in accordance with some embodiments.

As shown in FIG. 11A and FIG. 11B, the boss 182 of one or more embodiments may comprise a main outlet 410 connected to the fill line 186 (FIG. 10) and configured to permit liquid hydrogen (LH2) to be transferred into the storage tank for refilling of the storage tank. The main outlet 410 is also connected to the outlet line 190 to permit hydrogen to be transferred out of the storage tank for fuel consumption. The main outlet 410 may be connected to a control valve to control the hydrogen mass flow rate into and out of the tank. The main outlet 410 may further comprise a pressure sensor and an overpressure valve. The overpressure valve may be configured to operate as a pressure relief valve (PRV) by allowing pressurized fuel to flow out of the tank in a controlled manner via an auxiliary passage. In some cases, the overpressure valve may comprise a passive or uncontrolled valve or burst disk configured to provide emergency pressure relief when the pressure sensor detects a tank pressure that exceeds a predetermined pressure threshold.

As shown in FIGS. 12 and 13, the boss 182 may further comprise a breather outlet 420 configured to vent any gas present in the storage tank during a filling operation. In some cases, the breather outlet 420 may also be used to add a redundant pressure sensor and/or an additional overpressure valve to increase the tank safety.

In any of the embodiments described herein, the boss 182 may further comprise one or more passageways for routing electrical connections 430, as shown in FIG. 11A and FIG. 11B. The electrical connections may be used to connect sensors, actuators, or heaters present within the tank to an external computing unit (e.g., a controller) or a power source. The fuel tank 100 can also include one or more electrical feedthrough assemblies 431 (FIG. 10) that can provide a sealed and protected pathway for electrical lines into the fuel storage tank, such as into the space between the outer shell 204 and the pressure vessel 125. The electrical lines can be connected to sensors, heaters, or other components. In one embodiment the electrical feedthrough 431 can include a multiple pin connector, such as a conventional 9-pin connector that allows for easy and quick connection of the fuel storage tank 100 to a source of electricity.

In some embodiments, the breather outlet 420 may be located within the main outlet to further reduce the overall heat leak associated with the storage tank. For example, as shown in FIG. 13, the breather outlet 420 may be located or nested within the main outlet 410. The main outlet 410 and the breather outlet 420 may be aligned in a concentric manner such that the center axes of the main outlet 410 and the breather outlet 420 coincide with each other. Alternatively, the center axes of the main outlet 410 and the breather outlet 420 may not or need not coincide.

In some embodiments the main outlet 410 and the breather outlet 420 may be physically disconnected from the boss inner cap when there is no need to consume and/or refill hydrogen from the tank. This may help to further reduce heat leakage through the boss 182. In some cases, a movable mechanism may be used to connect the main outlet 410 and the breather outlet 420 to an inner cap of the boss as needed (e.g., when refilling the tank or when consuming the hydrogen stored within the tank).

In some embodiments, the boss 182 may comprise an insulation layer 440 to minimize the heat transfer between the tank surroundings and the cryogenic hydrogen, as shown in FIG. 12. In some cases, the insulation layer 440 may comprise alternating sheets of spacered superinsulation to minimize heat transfers due to thermal radiation. The insulation layer 440 may also be held at a high vacuum to minimize heat transfers due to thermal conduction and convection.

As illustrated in FIG. 12, in some embodiments, a support tube 450 made of a material with a low thermal conductivity may be added to bear the structural loads between an inner cap 460 and an outer cap 470 of the boss. This may allow for thinner outlet tubes, since the inner cap 460 and the outer cap 470 do not have to bear any structural loads, which in turn may reduce the overall boss heat leak, provided that the support tube 450 has a lower thermal conductivity than the outlet tubes. In some embodiments, the support tube 450 may comprise fiberglass or a rigid plastic.

Figure 14:
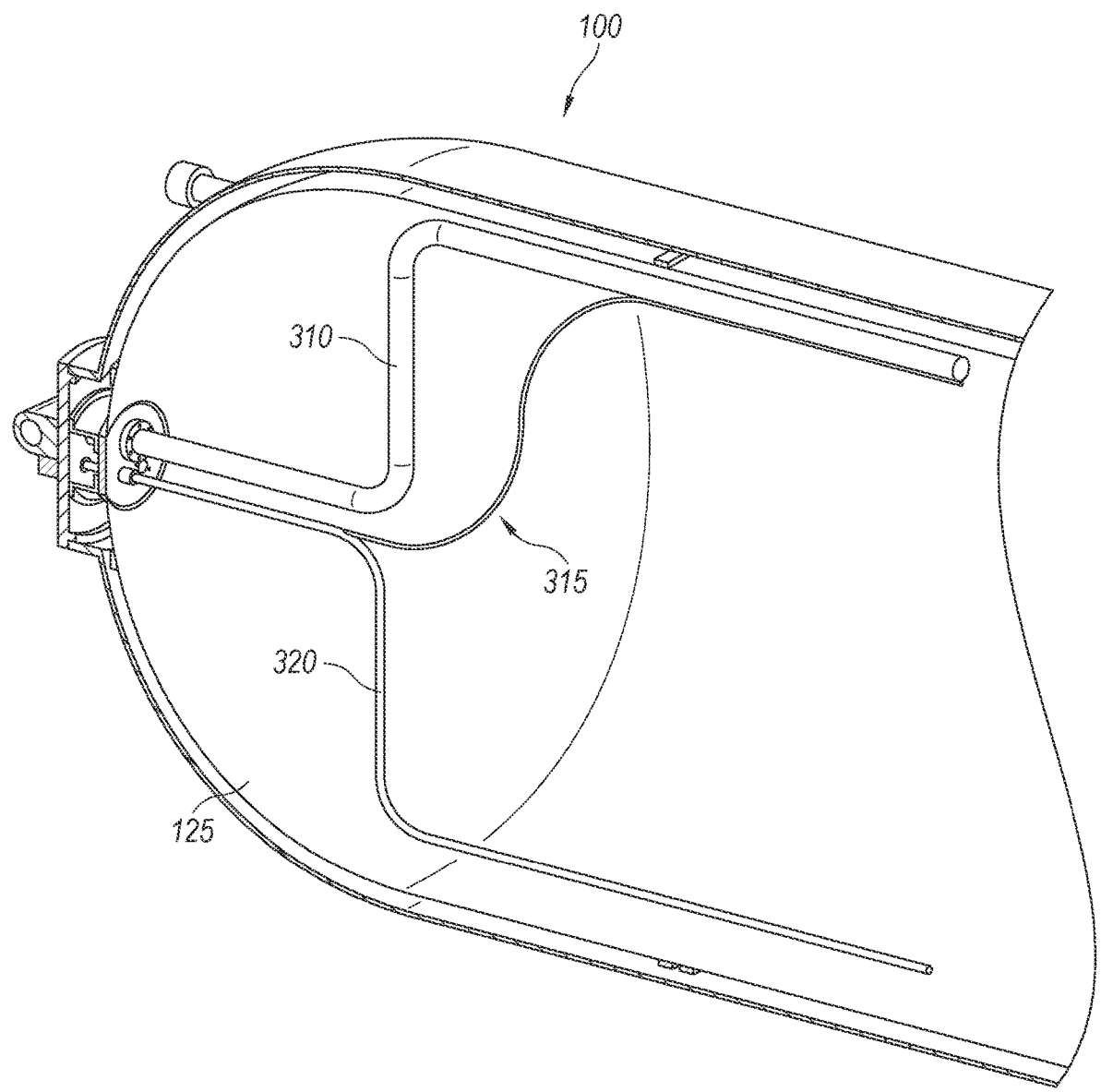
FIG. 14 schematically illustrates a gaseous hydrogen pickup line and an electric heater of a storage tank, in accordance with some embodiments.

As shown in FIG. 14, the interior volume of the liquid hydrogen storage tank 100 may comprise a hydrogen pickup line 310 to capture and distribute gaseous hydrogen. The hydrogen pickup line 310 may be fixed towards the top of the interior volume of the tank's pressure vessel 125 in a space within the internal volume that will be above the cryogenic liquid hydrogen. Alternatively, the hydrogen pickup line 310 may be on a float to remain above the liquid hydrogen stored within the tank. Accordingly, the hydrogen pickup line 310 is positioned in the tank's pressure vessel 125 above the liquid hydrogen and in the upper volume or headspace that contains gaseous hydrogen. The hydrogen fuel can be primarily stored as cryogenic liquid hydrogen, and the headspace in the pressure vessel 125 allows a portion of the hydrogen fuel to change phases so, when the hydrogen is drawn from the pressure vessel 125 during use, the hydrogen is in a gaseous state. This allows the hydrogen's phase change to occurs in the storage tank, so other systems are not needed external of the fuel storage tank 100 to accommodate the phase change prior to providing the gaseous hydrogen to a fuel cell or other hydrogen consuming components. In some cases, the hydrogen pickup line 310 may contain an internal heater 315 to ensure that the hydrogen pickup line 310 can continue to distribute gaseous hydrogen even if it is submerged into the liquid hydrogen stored within the tank. In some cases, the internal heater 315 may be operatively coupled to an independent source of thermal energy. In other cases, the internal heater 315 may be thermally coupled to a primary electric heater 320.

As shown in FIG. 14, the interior volume of the liquid hydrogen storage tank may further comprise a primary electric heater 320 to heat up the liquid hydrogen within the tank. The primary electric heater 320 may be configured to modulate the temperature of the hydrogen within the tank. In some cases, the primary electric heater 320 may be configured to indirectly control the tank pressure by adjusting the temperature of the hydrogen within the tank. The primary electric heater 320 and/or the internal heater 315 may be coupled to the electrical feedthrough 431.

In some cases, the internal volume of the liquid hydrogen storage tank may further comprise one or more sensors. The one or more sensors may comprise a temperature sensor and/or a pressure sensor for detecting or measuring ambient conditions or the temperature and/or pressure of the hydrogen fuel stored within the fuel storage tank. In some cases, the one or more sensors may comprise pressure gauges, strain gauges, thermocouples, thermistors, and/or mass flow meters. The one or more sensors may be configured to measure the tank pressure, the tank temperature, and/or the fuel level within the tank. In some cases, the one or more sensors may be configured to detect leaks or changes in fuel level, fuel pressure, or fuel temperature over time. In some alternative embodiments, the one or more sensors may comprise an accelerometer, an optical sensor, a shock sensor, a damage sensor, an acoustic sensor, a piezoresistive strain gauge, a capacitive pressure sensor, an electromagnetic pressure sensor, a piezoelectric pressure sensor, an optical pressure sensor, an potentiometric pressure sensor, a resonant pressure sensor, a thermal pressure sensor, and/or an ionization pressure sensor.

Figure 15:
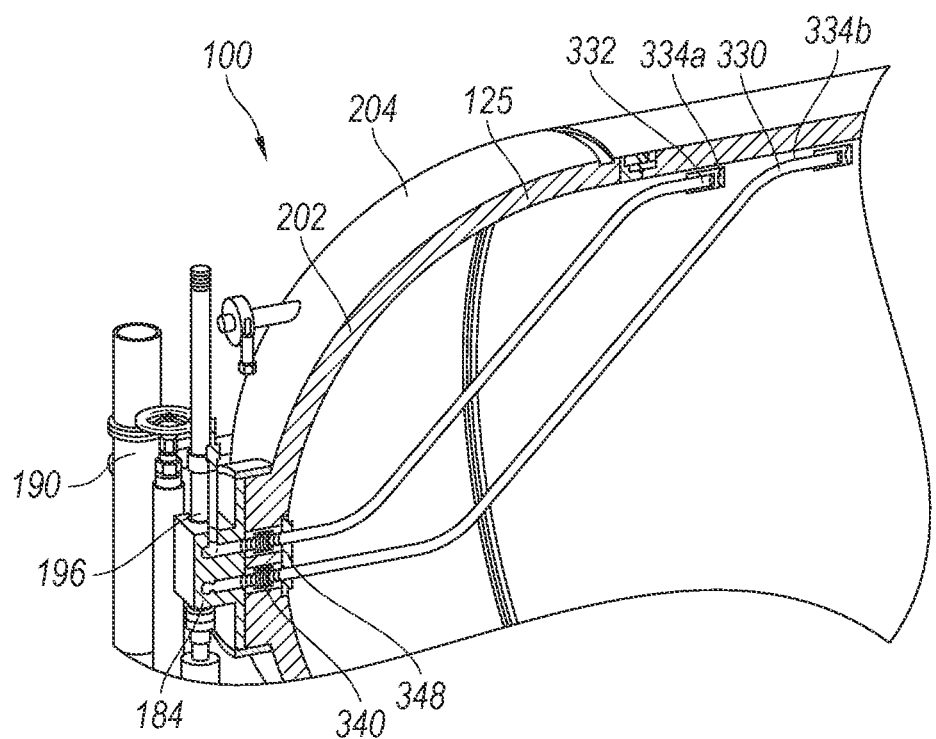
FIG. 15 is a partial sectional view of the fuel storage tank of FIG. 2A illustrating internal features.

FIG. 15 is a partial sectional view of the fuel storage tank 100 of FIG. 2A illustrating internal plumbing features, including a liquid fill line 330 and a gas outlet line 332. In the illustrated embodiment, the liquid fill line 330 is coupled to the manifold structure 184 and the fill line 186 (FIG. 10) external of the tank. The gas outlet line 332 is also coupled to the manifold structure 184 and the external outlet line 190 (FIG. 10). In some embodiments, the liquid fill line 330 and the gas outlet line 332 can be connected to a single manifold assembly or to separate components coupled to the external fill line 186 and outlet line 190 (FIG. 10), respectively. In the illustrated embodiment, the distal ends 334a, 334b of the liquid fill line 330 and the gas outlet line 332, respectively, are secured or otherwise positioned adjacent to the top of the pressure vessel 125. Accordingly, the distal ends 334a, 334b will be in a headspace containing gaseous hydrogen and above the liquid hydrogen fuel.

The fuel tank's pressure vessel 125 is exposed to the very low cryogenic temperatures of the liquid hydrogen, as well as internal pressure changes that can occur use and fuel depletion, fuel refilling, as well as due to changes in external ambient pressures and temperatures. The internal pressure vessel 125, the outer shell 204, the gas outlet line 332 and the liquid fill line 334 will often contract and/or expand during use, but the rate and/or extent of such contraction and expansion within the tank often will be different than external of the tank. In the illustrated embodiment, expansion bellows 340 are provided between the manifold structure 184 on the boss 182 and each of the gas outlet line 332 and liquid fill line 334 to accommodate for the contraction and expansion within the tank.

Figure 16:
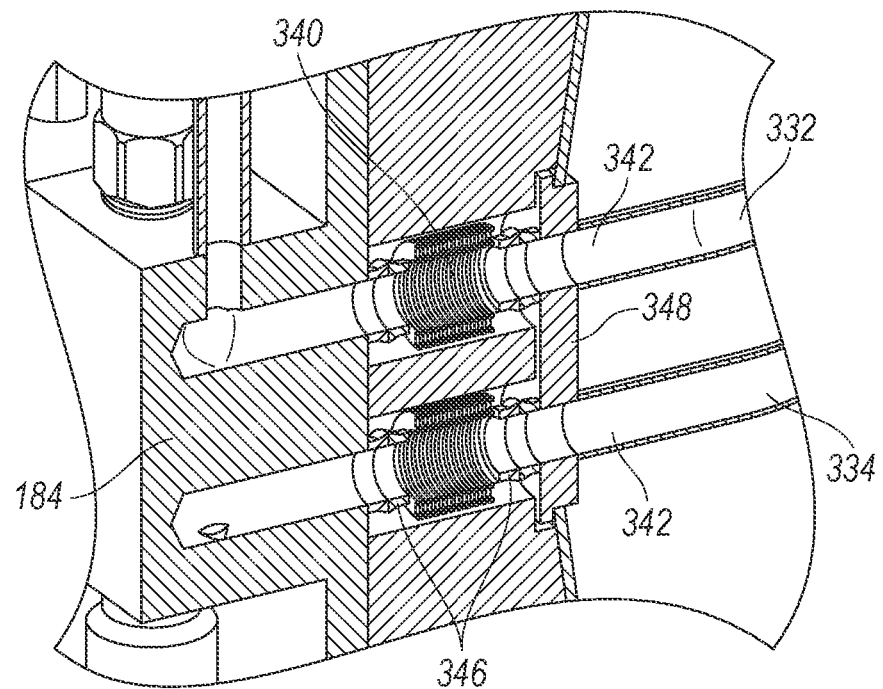
FIG. 16 is an enlarged sectional view of the boss and expansion bellows coupled to internal features of the tank.

FIG. 16 is an enlarged sectional view of the boss 182 and the manifold structure 184 showing expansion bellows 340 coupled to the gas outlet line 332 and liquid fill line 334 in the pressure vessel 125. In the illustrated embodiment, a bellows 340 is coupled to the proximal end 342 of each of the gas outlet line 332 and liquid fill line 334. The other end of the bellows 340 is coupled to the manifold structure 184 and in communication with a respective one of the external fill lines 186 and the external outlet line 190. The bellows 340 can be positioned between the pressure vessel 125 and the outer shell 204. The bellows 340 can be surrounded by the spacered superinsulation in the second layer 202 (FIG. 5C). in the illustrated embodiment, the bellows are made of a selected metal, such as SS316, although other suitable metal. The bellows 340 are configured to allow for the contraction and expansion of the pressure vessel 125 relative to the manifold structure 184, the boss 182 and/or the outer shell. For example, in at least one embodiment the pressure vessel 125, which is centrally supported within the outer shell 204 by the retention strap assemblies 140, will expand and contract during use by up to approximately 13 mm. Accordingly, the bellows 340 as well as the retention strap assemblies 140 are configured to accommodate for such contraction and expansion relative to the outer shell 204.

In the illustrated embodiment, one end of the bellows 340 is connected via a bimetallic fitting 346 to the manifold structure 184, and the other end is connected via another bimetallic fitting 346 to the respective gas outlet line 332 and liquid fill line 334. The bellows 340 can be edge-welded bellows that allow for flex, expansion, and/or contraction of the pressure vessel, the gas outlet line, the liquid fuel line, and other connected components. The fittings 346 and/or the bellows 340 can be connected to a support bracket 348, and the support bracket can be connected to the pressure vessel 125 to help support the fittings and the bellows while allowing for the expansion and contraction within the fuel storage tank. In some embodiments, sensors and/or overpressure valves can be connected to the manifold structure 184, the gas outlet line 332, and/or the gas outlet line 190 to help monitor and control flow of the hydrogen fuel from the tank.

Figures 1, 17:
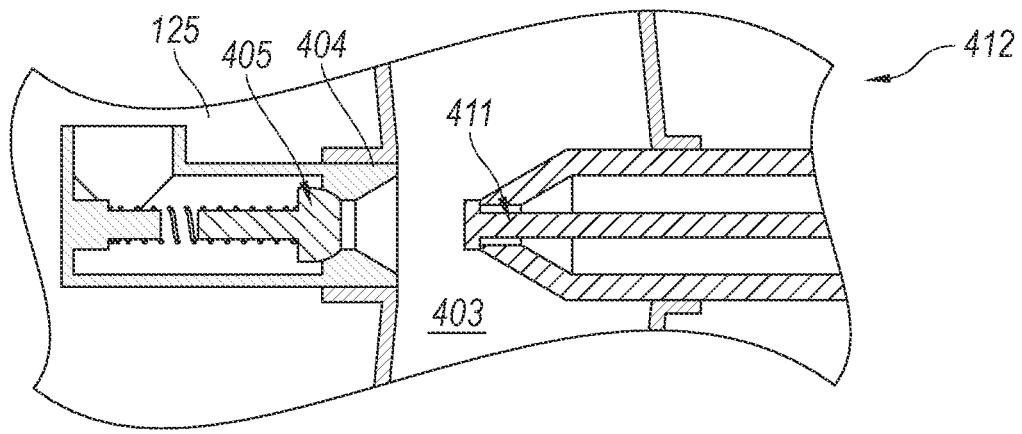
Figures 2, 17:
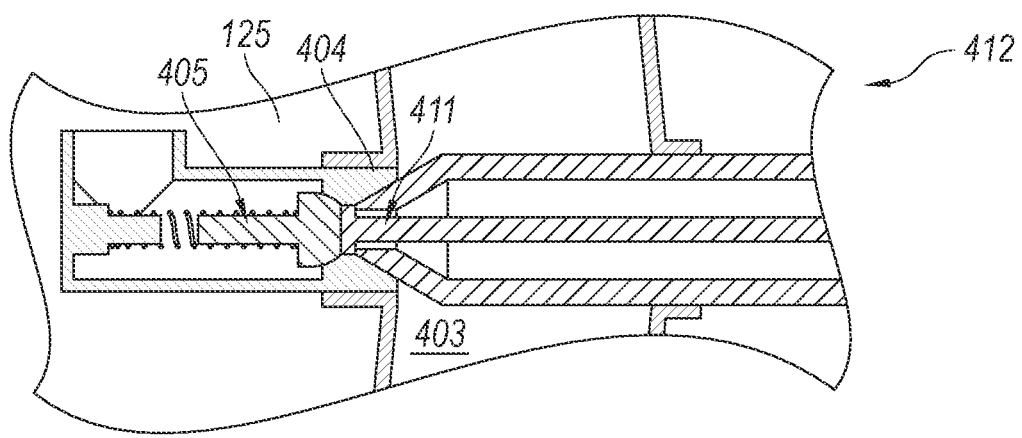
Figures 3, 17:
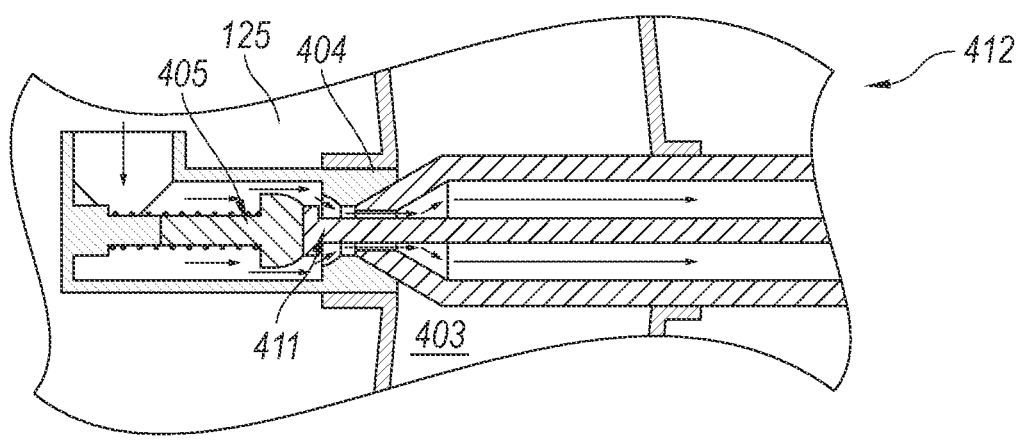

FIGS. 17-1, 17-2 and 17-3 illustrate an operation of the storage tank 100 in accordance with one or more embodiments to release hydrogen fuel from the storage tank 100 for consumption by a hydrogen fuel compatible vehicle. The storage tank 100 may be sealed from a vacuum layer 403 using a spring plunger 405. The spring plunger 405 may be positioned against an internal valve body seat 404 (FIGS. 17-1 and 17-2). An outer nozzle of the storage tank 100 may be sealed from the vacuum layer 403 by a piston 411. The outer nozzle 412 may be configured for double action movement. A first action of the outer nozzle 412 may seat the outer nozzle against the internal valve body seat 404, thereby blocking the flow path of the fuel into the vacuum layer. A second action of the outer nozzle 412 may extend the piston 411 and unseal the outer nozzle (FIG. 17-63). The extension of the piston 411 may push the spring plunger 405 back, allowing the flow of fuel from the storage tank into the outer nozzle. In some embodiments, the components and movable mechanisms shown in FIGS. 17-1, 17-2 and 17-3 may be used to disconnect the boss inner and outer cap when hydrogen is not being used (e.g., when there is no need to consume and/or refill hydrogen from the tank). In other embodiments, the outer nozzle 412 may be seated adjacent to or against the first layer of the tank (i.e., the pressure vessel 125, such that the outer nozzle 412 remains in a fixed position and/or a fixed orientation.

Figure 18:
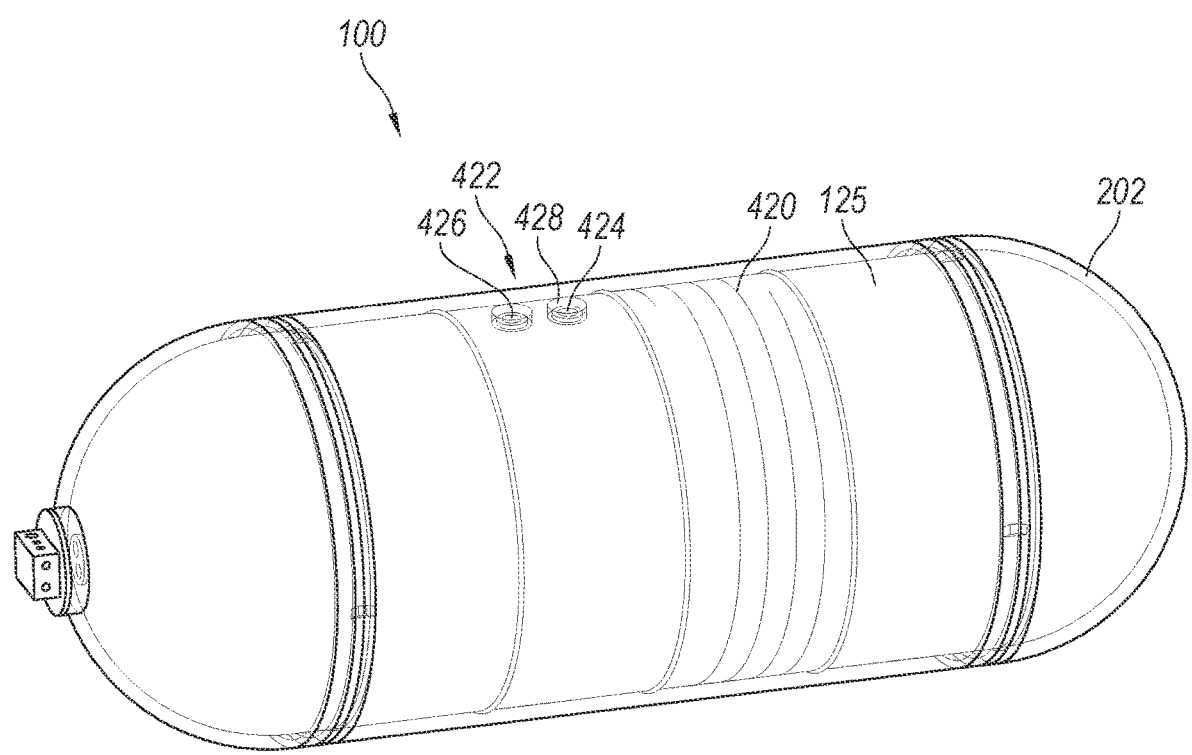
FIG. 18 is a schematic isometric view of a fuel storage tank with a heating coil and sensors coupled to the inner pressure vessel in accordance with some embodiments.

FIG. 18 is a schematic isometric view of a hydrogen fuel tank 100 of an embodiment with a heating coil 420 and sensors 422 coupled to the inner pressure vessel 125. In the illustrated embodiment, the heating coil 420 is a heating wire wrapped around the exterior of the pressure vessel 125. The heating coil 420 can be a nichrome wire heater epoxied to the pressure vessel 125. The heating coil 420 can be positioned between the outer surface of the pressure vessel 125 and the spaced superinsulation of the second layer 202, so as to selectively provide heat to the pressure vessel, while the spaced superinsulation and the high vacuum of the second layer 202 isolate the outer shell from the heat. The heating coil 420 can be configured to extend through the electric feedthrough 431 mounted to the outer shell 204 (FIG. 10).

Figure 19:
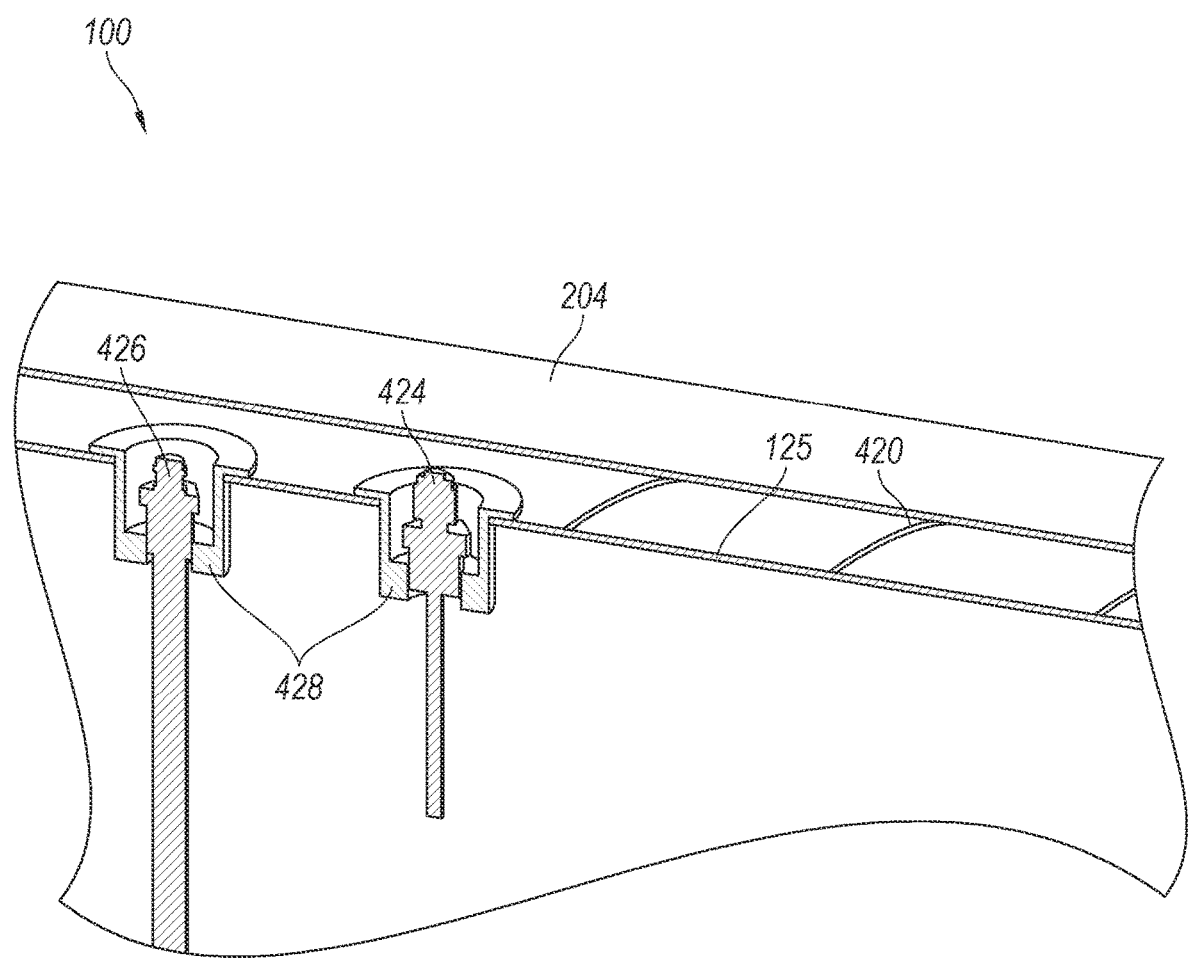
FIG. 19 is an enlarged partial cross-sectional view of the fuel storage tank of FIG. 18.

In addition to controlling the heat to the pressure vessel 125, the hydrogen fuel tank 100 is configured to monitor the temperature within the pressure vessel 125 as well as the fluid level of the liquid hydrogen within the pressure vessel's interior area. As best seen in FIG. 19, at least one embodiment has a temperature sensor 424 extending into the interior area of the pressure vessel 125. The temperature sensor 424 can be positioned at the top of the pressure vessel and extend at least partially into the top headspace in the pressure vessel 125 above the liquid hydrogen. In addition to the temperature sensor 124, the fuel tank 100 of the illustrated embodiment has a level sensor 426 extending into the interior area of the pressure vessel 125. The level sensor 426 is configured to detect and monitor the level of the cryogenic liquid hydrogen fuel within the pressure vessel 125. In one embodiment, the level sensor 426 can be a capacitive sensor, although other embodiments can use other sensors suitable for use in the cryogenic conditions.

In the illustrated embodiment, the temperature sensor 424 and the level sensor are threaded and sealably screw into a deep-set bung 428 extending through and welded to the top wall of the pressure vessel 125. Each sensor 424 and 426 and corresponding bung 428 can use standard, NPT (national pipe thread) threads. Each sensor 424 and 426 is also sealed into its respective the threaded bung 428 with a sealant configured to withstand the cryogenic temperatures, to create a complete seal to avoid cryogenic leaks into the high vacuum in the second layer 202 (FIG. 5A) between the pressure vessel 125 and the outer shell 204. The sensors 424 and 426 can be connected to power or data line that extends through the electric feedthrough 431.

In an aspect, the present disclosure provides a method for transporting hydrogen fuel for consumption. The method may comprise providing hydrogen to one or more fuel storage tanks. The one or more fuel storage tanks may be configured to store liquid hydrogen fuel at a cryogenic temperature for a predetermined amount of time. The storage tanks may comprise a plurality of layers comprising: a first layer comprising a pressure vessel for containing said fuel at a pressurized state; a second layer comprising insulation for said first layer; a third layer comprising a vapor barrier; and a fourth layer comprising a shell configured to maintain a rigidity of the storage tank and provide an outer surface for handling and accepting fittings. In some embodiments, the method may further comprise determining a demand for hydrogen fuel and coordinating a delivery or a transportation of one or more hydrogen fuel storage tanks to one or more hydrogen fuel compatible vehicles located at or near one or more vehicle fueling sites, based at least in part on the demand for hydrogen. In some cases, the demand for hydrogen fuel may be determined before the one or more fuel storage tanks are filled or refilled with hydrogen. In other cases, the demand for hydrogen fuel may be determined after the one or more fuel storage tanks are filled or refilled with hydrogen. In some embodiments, the method may further comprise transporting one or more storage tanks containing the hydrogen fuel to a vehicle fueling site. One or more hydrogen fuel compatible vehicles may be located at or near said vehicle fueling site. In some embodiments, the method may further comprise extracting the hydrogen from the storage tank and providing the extracted hydrogen to one or more hydrogen fuel compatible vehicles, which may be configured to use the hydrogen for propulsion or movement.

Figure 20:
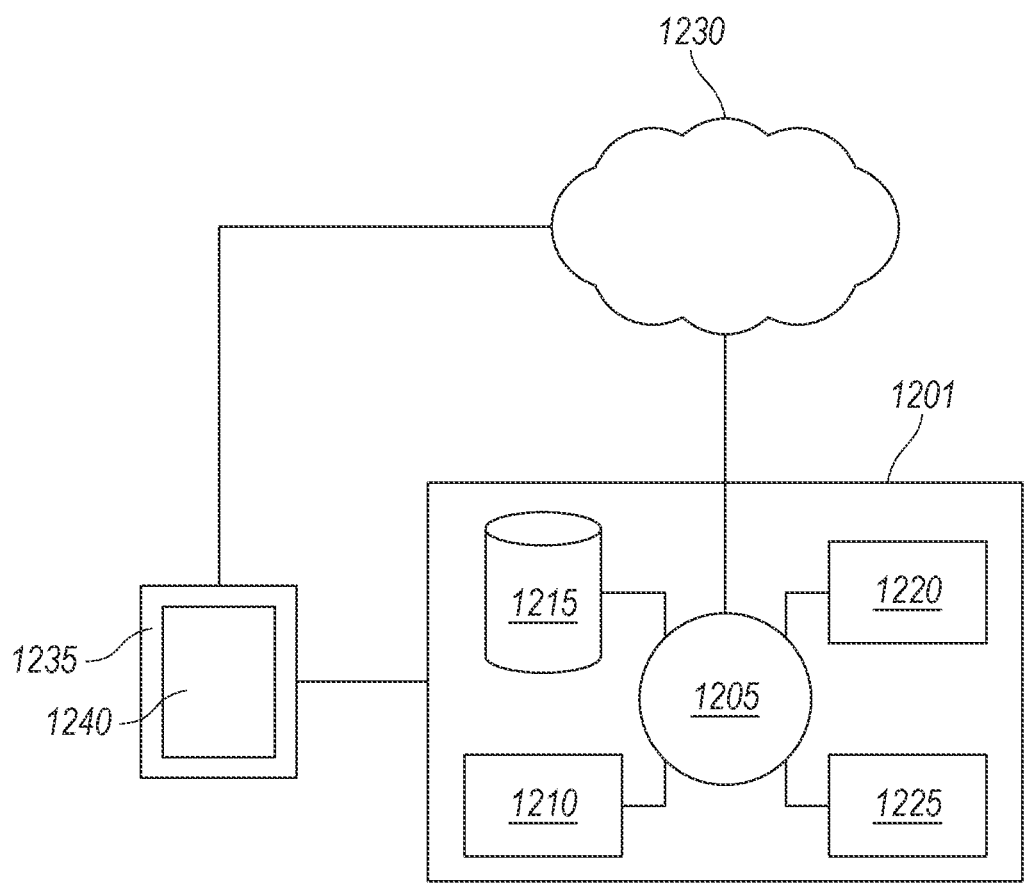
FIG. 20 schematically illustrates a computer system programmed or otherwise configured to implement methods provided herein.

In an aspect, the present disclosure provides computer systems that are programmed or otherwise configured to implement methods of the disclosure, e.g., any of the subject methods for storing and transporting hydrogen for consumption. FIG. 20 shows a computer system 1201 programmed or otherwise configured to implement a method for storing, transporting, and consuming hydrogen. The computer system 1201 may be configured to, for example, determine a demand for hydrogen fuel storage modules and coordinate a delivery or a transportation of one or more hydrogen fuel storage modules to one or more hydrogen fuel compatible vehicles located at or near one or more vehicle fueling sites. The computer system 1201 can be an electronic device of a user or a computer system remotely located with respect to the electronic device. The electronic device can be a mobile electronic device.

The computer system 1201 may include a central processing unit (CPU, also "processor" and "computer processor" herein) 1205, which can be a single core or multi core processor, or a plurality of processors for parallel processing. The computer system 1201 also includes memory or memory location 1210 (e.g., random-access memory, read-only memory, flash memory), electronic storage unit 1215 (e.g., hard disk), communication interface 1220 (e.g., network adapter) for communicating with one or more other systems, and peripheral devices 1225, such as cache, other memory, data storage and/or electronic display adapters. The memory 1210, storage unit 1215, interface 1220 and peripheral devices 1225 are in communication with the CPU 1205 through a communication bus (solid lines), such as a motherboard. The storage unit 1215 can be a data storage unit (or data repository) for storing data. The computer system 1201 can be operatively coupled to a computer network ("network") 1230 with the aid of the communication interface 1220. The network 1230 can be the Internet, an internet and/or extranet, or an intranet and/or extranet in communication with the Internet. The network 1230 in some cases is a telecommunication and/or data network. The network 1230 can include one or more computer servers, which can enable distributed computing, such as cloud computing. The network 1230, in some cases with the aid of the computer system 1201, can implement a peer-to-peer network, which may enable devices coupled to the computer system 1201 to behave as a client or a server.

The CPU 1205 can execute a sequence of machine-readable instructions, which can be embodied in a program or software. The instructions may be stored in a memory location, such as the memory 1210. The instructions can be directed to the CPU 1205, which can subsequently program or otherwise configure the CPU 1205 to implement methods of the present disclosure. Examples of operations performed by the CPU 1205 can include fetch, decode, execute, and writeback.

The CPU 1205 can be part of a circuit, such as an integrated circuit. One or more other components of the system 1201 can be included in the circuit. In some cases, the circuit is an application specific integrated circuit (ASIC).

The storage unit 1215 can store files, such as drivers, libraries and saved programs. The storage unit 1215 can store user data, e.g., user preferences and user programs. The computer system 1201 in some cases can include one or more additional data storage units that are located external to the computer system 1201 (e.g., on a remote server in communication with the computer system 1201 through an intranet or the Internet).

The computer system 1201 can communicate with one or more remote computer systems through the network 1230. For instance, the computer system 1201 can communicate with a remote computer system of a user (e.g., an operator of a hydrogen fuel compatible vehicle, an operator of a transport vehicle for transporting one or more hydrogen fuel storage modules, a technician at a hydrogen production facility, an entity managing a just-in-time network for hydrogen fuel cell delivery and distribution, etc.). Examples of remote computer systems include personal computers (e.g., portable PC), slate or tablet PC's (e.g., Apple® iPad, Samsung® Gala12 Tab), telephones, Smart phones (e.g., Apple® iPhone, Android-enabled device, Blackberry®), or personal digital assistants. The user can access the computer system 1201 via the network 1230.

Methods as described herein can be implemented by way of machine (e.g., computer processor) executable code stored on an electronic storage location of the computer system 1201, such as, for example, on the memory 1210 or electronic storage unit 1215. The machine executable or machine readable code can be provided in the form of software. During use, the code can be executed by the processor 1205. In some cases, the code can be retrieved from the storage unit 1215 and stored on the memory 1210 for ready access by the processor 1205. In some situations, the electronic storage unit 1215 can be precluded, and machine-executable instructions are stored on memory 1210.

The code can be pre-compiled and configured for use with a machine having a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1201, can be embodied in programming. Various aspects of the technology may be thought of as "products" or "articles of manufacture" typically in the form of machine (or processor) executable code and/or associated data carried on or embodied in a type of machine readable medium. Machine-executable code can be stored on an electronic storage unit, such as memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media including, for example, optical or magnetic disks, or any storage devices in any computer(s) or the like, may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1201 can include or be in communication with an electronic display 1235 that comprises a user interface (UI) 1240 for providing, for example, portal for monitoring a transportation or a usage of one or more hydrogen fuel storage modules. The portal may be provided through an application programming interface (API). A user or entity can also interact with various elements in the portal via the UI. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1205. The algorithm may be configured to determine a demand for hydrogen fuel storage modules and to coordinate a delivery or a transportation of one or more hydrogen fuel storage modules to one or more hydrogen fuel compatible vehicles located at or near one or more vehicle fueling sites.

Figure 21:
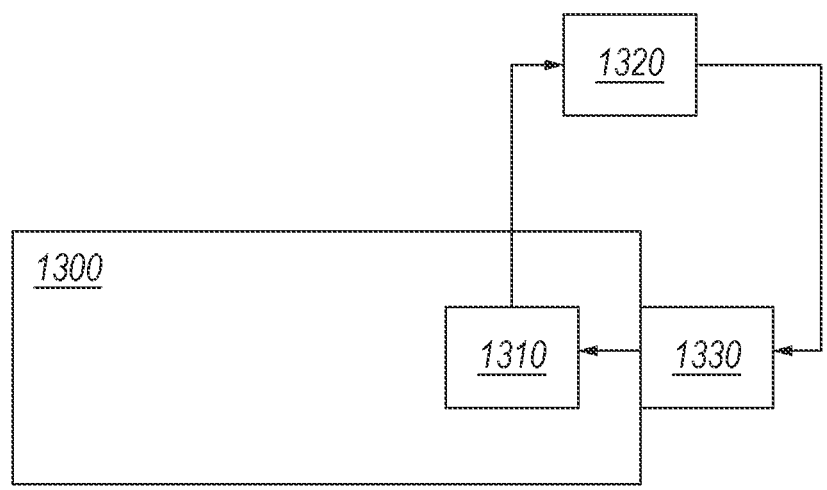
FIG. 21 schematically illustrates a control system for modulating an operation of the storage tank, in accordance with some embodiments.

FIG. 21 illustrates a control system for modulating an operation of a storage tank 1300. The control system may comprise one or more sensors 1310 and a controller 1320. The one or more sensors 1310 may be operatively coupled to the controller 1320. The one or more sensors 1310 may be integrated with a flow control mechanism 1330 of the storage tank 1300. The controller 1320 may be configured to implement a feedback loop to adjust or modulate the flow control mechanism 1330 based on one or more measurements obtained using the one or more sensors 1310. The flow control mechanism 1330 may comprise, for example, an actuator, a valve, or any other movable component that may be electronically controlled by the controller 1320 (e.g., automatically controlled or user-controlled) to regulate a flow rate of hydrogen into and/or out of the storage tank. In some cases, the flow control mechanism 1330 may correspond to the flow control components (e.g., the spring plunger 405 and/or the piston 411) shown in FIG. 17.

In some embodiments, the control system of FIG. 21 may be used to control the flow of hydrogen fuel into the storage tank when the storage tank is being filled or refilled. In such cases, the one or more sensors 1310 may comprise a pressure sensor and/or a flow sensor. As hydrogen is being transferred into the storage tank, the one or more sensors 1310 may monitor a pressure of the tank or a flow rate of the hydrogen into the tank. The measurements obtained using the one or more sensors 1310 may be provided to the controller 1320 in real-time. The controller 1320 may be configured to (i) monitor the flow rate of hydrogen into the tank or the pressure of the fuel within the tank and (ii) send a command to the flow control mechanism 1330 to increase, decrease, or restrict the supply of the hydrogen fuel to the fuel storage tank when the flow rate of hydrogen fuel or the pressure of the hydrogen fuel in the storage tank reaches a predetermined threshold. In some cases, the controller 1320 may be configured to (i) monitor the pressure of the fuel within the tank or the flow rate of hydrogen into the tank and (ii) send a command to the flow control mechanism 1330 to increase, decrease, or restrict the flow of hydrogen fuel into the fuel storage tank, based at least in part on pressure measurements or flow measurements obtained using the one or more sensors 1310.

In other embodiments, the control system of FIG. 21 may be used to control the flow of hydrogen fuel out of the storage tank when the hydrogen fuel in the storage tank is being used or consumed. In such cases, the one or more sensors 1310 may comprise a pressure sensor and/or a flow sensor. As hydrogen is being transferred out of the storage tank, the one or more sensors 1310 may monitor a pressure of the tank or a flow rate of the hydrogen out of the tank. The measurements obtained using the one or more sensors 1310 may be provided to the controller 1320 in real-time. The controller 1320 may be configured to (i) monitor the flow rate of hydrogen out of the tank or the pressure of the fuel within the tank and (ii) send a command to the flow control mechanism 1330 to increase, decrease, or restrict the flow of hydrogen fuel out of the fuel storage tank when the flow rate of hydrogen fuel or the pressure of the hydrogen fuel in the storage tank reaches a predetermined threshold. In some cases, the controller 1320 may be configured to (i) monitor the pressure of the fuel within the tank or the flow rate of hydrogen out of the tank and (ii) send a command to the flow control mechanism 1330 to increase, decrease, or restrict the flow rate of hydrogen fuel out of the fuel storage tank, based at least in part on flow measurements or pressure measurements obtained using the one or more sensors 1310.

While preferred embodiments of the present disclosure have been shown and described herein, it will be obvious to those skilled in the art that such embodiments are provided by way of example only. It is not intended that the disclosure be limited by the specific examples provided within the specification. While the disclosure has been described with reference to the aforementioned specification, the descriptions and illustrations of the embodiments herein are not meant to be construed in a limiting sense. Numerous variations, changes, and substitutions will now occur to those skilled in the art without departing from the disclosure. Furthermore, it shall be understood that all aspects of the disclosure are not limited to the specific depictions, configurations or relative proportions set forth herein which depend upon a variety of conditions and variables. It should be understood that various alternatives to the embodiments of the disclosure described herein may be employed in practicing the disclosure. It is therefore contemplated that the disclosure shall also cover any such alternatives, modifications, variations or equivalents. It is intended that the following claims define the scope of the disclosure and that methods and structures within the scope of these claims and their equivalents be covered thereby.

We claim:

1. A liquid hydrogen storage tank assembly, comprising:
a rigid outer tank shell comprising a substantially cylindrical first body portion and substantially hemispherical first end caps affixed directly to opposing first end portions of the first body portion, the first body portion and the first end portions defining an internal volume;
outer girth rings affixed to the first end portions of the first body portion adjacent to a respective one of the first end caps;
an inner tank within the internal volume and forming a pressure vessel for containing liquid hydrogen fuel substantially at cryogenic temperature and at a pressurized state, the inner tank comprising a substantially cylindrical second body portion in the internal volume and fully surrounded by the first body portion, wherein the second body portion is substantially coaxially positioned within and spaced apart from the first body portion, the inner tank further comprising substantially hemispherical second end caps affixed directly to opposing second ends of the second body portion, wherein the second end caps are substantially coaxially positioned within and spaced apart from adjacent ones of the first end caps, wherein the inner tank is suspended in a substantially concentric arrangement within the outer tank shell to form an interstitial space between the inner tank and the outer tank shell;
inner girth rings affixed to the second end portions of the second body portion adjacent to a respective one of the second end caps, the inner girth rings being substantially concentrically arranged and radially inward from the outer girth rings;
a plurality of retention strap assemblies interconnecting the first and second body portions and suspending the inner tank in the interior volume within the outer tank shell and allowing for movement of the inner tank relative to the outer tank shell due to contraction or expansion of the inner tank, each retention strap assembly comprising a strap member configured to pivot and maintain a constant length and tension as the inner tank expands or contracts relative to the outer tank shell;
wherein a first group of the retention strap assemblies each comprise a first inner anchor portion directly connected to one of the inner girth rings and positioned in the interstitial space between the first and second body portions, and comprise a first outer anchor portion directly connected to one of the outer girth rings and positioned in the interstitial space between the first and second body portions, wherein each first outer anchor portion is spaced at least partially longitudinally apart from a respective one of the first inner anchor portions;

wherein a second group of the retention strap assemblies each comprise a second inner anchor portion directly connected to the other one of the inner girth rings and positioned in the interstitial space, and the second group of retention strap assemblies comprise a second outer anchor portion directly connected to the other one of the outer girth rings and positioned in the interstitial space, wherein each first outer anchor portion is spaced at least partially longitudinally apart from a respective one of the first inner anchor portions;

wherein first strap members of the first group of retention strap assemblies are directly connected to and extend between adjacent first inner and outer anchor portions, and second strap members of the second group of retention strap assemblies are directly connected to and extend between adjacent second inner and outer anchor portions; and wherein the first inner or outer anchor portions of each retention strap assembly comprise an adjustable translatable carriage coupled to the strap member, wherein the translatable carriage is movable longitudinally relative to the inner and outer cylindrical bodies to control tension in the strap member.

2. The assembly of claim 1 wherein the inner tank is maintained at a first vacuum condition, and the interstitial space is maintained at a second vacuum condition with a pressure greater than the first vacuum condition but less than atmospheric pressure.

3. The assembly of claim 1 wherein the retention strap assemblies are each configured so that, when the inner tank contracts or expands relative to the outer tank shell, the strap maintains a constant length and pivots about the respective inner or outer anchor portion while maintaining a constant tension in the strap.

4. The assembly of claim 1 wherein the retention strap assemblies are positioned to be accessed and adjusted to position and suspend the second body portion within the first body portion before the first and second end caps are affixed to the respective first and second body portions, and after the first and second end caps are affixed to the respective first and second body portions, the retention strap assemblies are fully contained between the inner tank and the outer tank shell and not accessible for adjustment.

5. The assembly of claim 1 wherein the retention strap assemblies provide thermal breaks between the pressure vessel and the outer tank shell.

6. The assembly of claim 1, further comprising a vapor barrier layer in the interstitial space between the inner tank and the outer tank shell.

7. The assembly of claim 1, further comprising a line connection body connected to one of the first end caps, a first fuel line external of the outer tank shell and sealably connected to the line connection body, and an inner cap sealably connected to one of the second end caps inwardly adjacent to the one of the first end caps, a second fuel line at least partially within the pressure vessel and in fluid communication with the first fuel line through the line connection body and through the inner cap, and an expansion member connected to the line connection body and to a proximal end of the second fuel outlet line, wherein the expansion member is positioned in between the line connection body and the inner cap, wherein the expansion member is configured to expand and contract axially upon movement of the inner tank relative to the outer tank shell.

8. The assembly of claim 7 wherein the expansion member is a bellows positioned in a space between the line connection body and the inner cap.

9. The assembly of claim 7 wherein the first and second fuel lines are fuel outlet lines configured to convey hydrogen in a gaseous state from a headspace within the pressure vessel.

10. The assembly of claim 1, further comprising multi-layered, spaced insulation positioned between in the inner tank and the outer tank shell in the interstitial space.

11. The assembly of claim 1, further comprising a heating coil positioned on the inner tank to controllably heat the inner tank.

12. The assembly of claim 1 wherein one of the inner endcaps has an inner cap plate, and the assembly further comprising a line connection body connected to one of the first end caps and positioned in or adjacent to the interstitial space between the adjacent ones of the first and second end caps, wherein the line connection body comprises a boss with a manifold member aligned with the inner cap plate, an external fuel line is exterior of the outer tank shell and is connected to the manifold member, a fuel pickup line is at least partially within the inner tank and extends through the inner cap plate and is in fluid communication with the manifold and the external fuel line, and an expansion bellows positioned between the adjacent ones of the first and second end caps, wherein the expansion bellows is connected to the manifold member and to a proximal end of the fuel pickup line, wherein the expansion bellows is configured to expand and contract within interstitial space upon the thermal contraction and expansion of the inner tank relative to the outer tank shell.

13. The assembly of claim 12 wherein the fuel pickup line has a distal end within the inner tank in the headspace above the liquid hydrogen and configured to draw gaseous hydrogen from the headspace through the fuel pickup line to the external fuel line through the expansion bellows and the line connection body.

* * * * *